US012637596B2

(12) United States Patent
Taoka et al.

(10) Patent No.: US 12,637,596 B2
(45) Date of Patent: May 26, 2026

(54) CREPING ADHESIVE, POWDER FOR USE AS CREPING ADHESIVE, METHOD FOR PRODUCING CREPING ADHESIVE, AND TOILET PAPER, TISSUE PAPER, PAPER TOWEL, KITCHEN PAPER, OR NAPKIN BASE PAPER

(71) Applicant: Kuraray Co., Ltd., Okayama (JP)

(72) Inventors: Yuta Taoka, Houston, TX (US); Misuzu Fujimori, Kurashiki (JP)

(73) Assignee: Kuraray Co., Ltd., Okayama (JP)

( * ) Notice: Subject to any disclaimer, the term of this patent is extended or adjusted under 35 U.S.C. 154(b) by 127 days.

(21) Appl. No.: 18/696,977

(22) PCT Filed: Sep. 30, 2022

(86) PCT No.: PCT/JP2022/036838

§ 371 (c)(1),
(2) Date: Mar. 28, 2024

(87) PCT Pub. No.: WO2023/054707

PCT Pub. Date: Apr. 6, 2023

(65) Prior Publication Data

US 2024/0409794 A1 Dec. 12, 2024

(30) Foreign Application Priority Data

Sep. 30, 2021 (JP) ................................ 2021-161465

(51) Int. Cl.
*C09J 129/04* (2006.01)
*C09J 11/06* (2006.01)

(52) U.S. Cl.
CPC ............ *C09J 129/04* (2013.01); *C09J 11/06* (2013.01)

(58) Field of Classification Search
None
See application file for complete search history.

(56) References Cited

U.S. PATENT DOCUMENTS

| | | | | |
|---|---|---|---|---|
| 3,926,716 | A | 12/1975 | Bates | |
| 2012/0247697 | A1* | 10/2012 | Lu | C08G 73/0286 524/106 |
| 2016/0326285 | A1* | 11/2016 | Mori | C08J 5/18 |
| 2021/0070908 | A1* | 3/2021 | Moustafa | C09D 151/003 |
| 2021/0310195 | A1* | 10/2021 | Bjerke | D21H 17/36 |

FOREIGN PATENT DOCUMENTS

| | | | |
|---|---|---|---|
| CN | 112888820 | A | 6/2021 |
| JP | 50-160509 | A | 12/1975 |
| WO | 97/44526 | A1 | 11/1997 |
| WO | 2020/080988 | A1 | 4/2020 |
| WO | 2021/050339 | A1 | 3/2021 |

OTHER PUBLICATIONS

International Search Report issued in the corresponding Application No. PCT/JP2022/036838, mailed Dec. 13, 2022.
Written Opinion issued in the corresponding Application No. PCT/JP2022/036838, mailed Dec. 13, 2022.

* cited by examiner

*Primary Examiner* — Michael N Orlando
*Assistant Examiner* — Abhishek A Patwardhan
(74) *Attorney, Agent, or Firm* — Morgan, Lewis & Bockius LLP

(57) ABSTRACT

Provided is a creping adhesive that is favorable in a thread-forming property, wet adhesiveness, and the like. A creping adhesive contains a PVA (A), wherein at least one of (i) and (ii) below is satisfied. (i) The PVA (A) includes a PVA having a minimum degree of branching of 0.25 or more and 0.93 or less within a range of an absolute molecular weight being 200,000 or more and 800,000 or less, and a ratio Mw/Mn of a weight-average molecular weight Mw to a number-average molecular weight Mn of the PVA (A) is 2.5 or more. (ii) The ratio Mw/Mn of the weight-average molecular weight Mw to the number-average molecular weight Mn of the PVA (A) is 3.8 or more.

20 Claims, 3 Drawing Sheets

CREPING ADHESIVE, POWDER FOR USE AS CREPING ADHESIVE, METHOD FOR PRODUCING CREPING ADHESIVE, AND TOILET PAPER, TISSUE PAPER, PAPER TOWEL, KITCHEN PAPER, OR NAPKIN BASE PAPER

TECHNICAL FIELD

The present invention relates to a creping adhesive, a powder for use as a creping adhesive, a method for producing a creping adhesive, and toilet paper, tissue paper, paper towel, kitchen paper, or napkin base paper.

BACKGROUND ART

In producing paper having flexibility and bulkiness, such as toilet paper or tissue paper, a process generally referred to a creping is carried out. Creping results in the emergence of fine wrinkles (crepes) on the paper, whereby flexibility and bulkiness are imparted thereto. The creping is carried out by, for example: a step of drying paper in a wet state (undried wet web obtained by sheet-making) by attaching the paper to a surface of a cylindrical dryer such as a Yankee dryer; and a step of scraping the dried paper from the surface of the dryer with a doctor blade. By thus scraping with the doctor blade, fine wrinkles are formed on the paper.

When the creping is carried out, typically, a creping adhesive is applied on the surface of the cylindrical dryer surface to form a coating film of the adhesive on the dryer surface. This coating film of the adhesive is effective for, e.g., enhancing the adhesiveness of the paper to the dryer. As such a creping adhesive to be used, an aqueous solution of a vinyl alcohol polymer (hereinafter, the vinyl alcohol polymer may be also referred to as "PVA") has been known (see Patent Document 1).

PRIOR ART DOCUMENTS

Patent Documents

Patent Document 1: PCT International Publication No. 97/44526

SUMMARY OF THE INVENTION

Problems to be Solved by the Invention

The creping adhesive is desired to permit favorable wet adhesiveness, i.e., favorable adhesion of a formed coating film to a subject in a wet state (wet web). In addition, the present inventors found that when a creping adhesive that is superior in a thread-forming property is used, forming a favorable crepe is enabled. Although the reason for this phenomenon is uncertain, it is assumed that when the creping adhesive that is superior in the thread-forming property is used, the adhesiveness between the paper and the dryer surface is improved due to permeation of the adhesive component (PVA) to pulp fibers being present comparatively inside the paper, and consequently, the crepe is likely to be formed at the time of being scraped with the doctor blade. However, due to a conventional creping adhesive in which a PVA is used not necessarily being satisfactory in terms of the thread-forming property, the wet adhesiveness, and the like, improvements thereof are desired.

An object of the present invention is to provide: a creping adhesive that is favorable in a thread-forming property and wet adhesiveness: a powder and a production method by which such a creping adhesive is obtained; and toilet paper, tissue paper, paper towel, kitchen paper, or napkin base paper in which such a creping adhesive is used.

Means for Solving the Problems

The object described above is accomplished by providing any one of the following:

(1) A creping adhesive containing a PVA (A), wherein at least one of (i) and (ii) below is satisfied:
- (i) the PVA (A) includes a PVA having a minimum degree of branching of 0.25 or more and 0.93 or less within a range of an absolute molecular weight being 200,000 or more and 800,000 or less, and a ratio Mw/Mn of a weight-average molecular weight Mw to a number-average molecular weight Mn of the PVA (A) is 2.5 or more; and
- (ii) the ratio Mw/Mn of the weight-average molecular weight Mw to the number-average molecular weight Mn of the PVA (A) is 3.8 or more:

(2) The creping adhesive according to (1), wherein the PVA (A) includes a PVA (A1) having a structural unit derived from at least one selected from the group consisting of: a monomer containing a carboxy group; and a derivative of the monomer;

(3) The creping adhesive according to (2), wherein the at least one selected from the group consisting of: the monomer containing a carboxy group; and the derivative of the monomer is at least one selected from the group consisting of: an ethylenic unsaturated dicarboxylic acid; and a monoester, a diester, and an anhydride thereof;

(4) The creping adhesive according to (2), wherein the at least one selected from the group consisting of: the monomer containing a carboxy group; and the derivative of the monomer is at least one selected from the group consisting of maleic acid, a maleic acid monoalkyl ester, a maleic acid dialkyl ester, maleic anhydride, fumaric acid, a fumaric acid monoalkyl ester, and a fumaric acid dialkyl ester;

(5) The creping adhesive according to any one of (2) to (4), wherein the PVA (A1) satisfies the following inequation (I):

$$S \times P > 250 \qquad \text{(I)}$$

wherein, in the inequation (I),

S represents a percentage content (mol %), with respect to total structural units, of the structural unit derived from the at least one selected from the group consisting of: the monomer containing a carboxy group; and the derivative of the monomer, and P represents a viscosity-average degree of polymerization:

(6) The creping adhesive according to any one of (2) to (5), wherein the PVA (A1) satisfies the following inequation (II):

$$1.0 < g_A/g_B < 3.0 \qquad \text{(II)}$$

wherein, in the inequation (II).

$g_A$ represents a degree of branching of the PVA (A1) having an absolute molecular weight of 200,000; and $g_B$ represents a degree of branching of the PVA (A1) having an absolute molecular weight of 800,000;

(7) The creping adhesive according to any one of (2) to (6), wherein a degree of saponification of the PVA (A1) is 65 mol % or more and 99 mol % or less;

(8) The creping adhesive according to any one of (2) to (7), wherein at least (i) above is satisfied, and the PVA having a minimum degree of branching of 0.25 or more and 0.93 or less within the range of an absolute molecular weight being 200,000 or more and 800,000 or less is the PVA (A1);

(9) The creping adhesive according to any one of (1) to (8), wherein the PVA (A) is a mixture of two or more types of PVAs that are different from one another in terms of at least one of the number-average molecular weight and a viscosity-average degree of polymerization;

(10) The creping adhesive according to (9), wherein a degree of saponification of at least one type of PVA of the two or more types of PVAs is 65 mol % or more and 99 mol % or less;

(11) The creping adhesive according to any one of (1) to (10), which is an aqueous solution wherein the PVA (A) is dissolved in water;

(12) The creping adhesive according to any one of (1) to (11), further containing a polyamide resin (B);

(13) The creping adhesive according to (12), wherein the polyamide resin (B) is a polyamidepolyamine-epihalohydrin resin;

(14) A powder for use as a creping adhesive containing a PVA (A), wherein at least one of (i) and (ii) below is satisfied:

(i) the PVA (A) includes a PVA having a minimum degree of branching of 0.25 or more and 0.93 or less within a range of an absolute molecular weight being 200,000 or more and 800,000 or less, and a ratio Mw/Mn of a weight-average molecular weight Mw to a number-average molecular weight Mn of the PVA (A) is 2.5 or more; and (ii) the ratio Mw/Mn of the weight-average molecular weight Mw to the number-average molecular weight Mn of the PVA (A) is 3.8 or more:

(15) The powder for use as a creping adhesive according to (14), wherein a percentage content of the powder capable of passing through a sieve having a mesh opening size of 180 μm is 12% by mass or less;

(16) The powder for use as a creping adhesive according to (14) or 15, wherein a percentage content of the powder capable of passing through a sieve having a mesh opening size of 1.00 mm is 97% by mass or more, and a percentage content of the powder capable of passing through a sieve having a mesh opening size of 500 μm is 40% by mass or more;

(17) The powder for use as a creping adhesive according to any one of (14) to (16), wherein an insoluble content of a mixture prepared by adding 4 parts by mass of the powder for use as a creping adhesive to 96 parts by mass of water followed by stirring at 150 rpm and 60° C. for 1 hour is 0.1 ppm or more and less than 2,000 ppm;

(18) The powder for use as a creping adhesive according to any one of (14) to (17), wherein the powder further contains a defoaming agent (C);

(19) The powder for use as a creping adhesive according to (18), wherein the defoaming agent (C) is at least one selected from the group consisting of a nonionic surfactant and an anionic surfactant;

(20) A method for producing a creping adhesive, the method including dissolving a PVA (A) in water, wherein at least one of (i) and (ii) below is satisfied:

(i) the PVA (A) includes a PVA having a minimum degree of branching of 0.25 or more and 0.93 or less within a range of an absolute molecular weight being 200,000 or more and 800,000 or less, and a ratio Mw/Mn of a weight-average molecular weight Mw to a number-average molecular weight Mn of the PVA (A) is 2.5 or more; and (ii) the ratio Mw/Mn of the weight-average molecular weight Mw to the number-average molecular weight Mn of the PVA (A) is 3.8 or more:

(21) The method for producing a creping adhesive according to (20), wherein at least (ii) above is satisfied, and as the PVA (A), a mixture of two or more types of PVAs that are different from one another in terms of at least one of the number-average molecular weight and the viscosity-average degree of polymerization is used:

(22) A toilet paper, a tissue paper, a paper towel, a kitchen paper, or a napkin base paper produced using the creping adhesive according to any one of (1) to (13); and

(23) A toilet paper, a tissue paper, a paper towel, a kitchen paper, or a napkin base paper containing a PVA (A), wherein at least one of (i) and (ii) below is satisfied:

(i) the PVA (A) includes a PVA having a minimum degree of branching of 0.25 or more and 0.93 or less within a range of an absolute molecular weight being 200,000 or more and 800,000 or less, and a ratio Mw/Mn of a weight-average molecular weight Mw to a number-average molecular weight Mn of the PVA (A) is 2.5 or more; and (ii) the ratio Mw/Mn of the weight-average molecular weight Mw to the number-average molecular weight Mn of the PVA (A) is 3.8 or more.

Effects of the Invention

The present invention enables providing: a creping adhesive that is favorable in a thread-forming property and wet adhesiveness; powder and a production method by which such a creping adhesive is obtained; and toilet paper, tissue paper, paper towel, kitchen paper, or napkin base paper in which such a creping adhesive is used.

DESCRIPTION OF EMBODIMENTS

Figure 1:
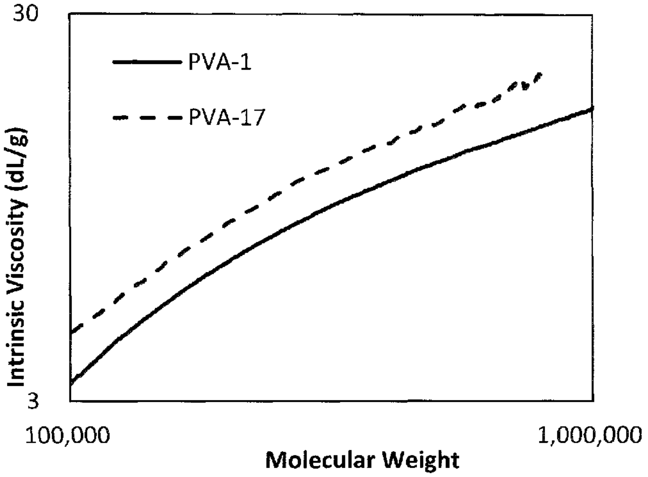
FIG. 1 is a graph showing a relationship between each absolute molecular weight and each intrinsic viscosity ($[\eta]_{branch}$ and $[\eta]_{linear}$) of PVA-1 and PVA-17 in EXAMPLES.

Hereinafter, embodiments for carrying out the present invention are described. It is to be noted that in the present specification, upper limit values and lower limit values of ranges of numerical values (contents of components, values and physical properties calculated from components, etc.)

can be combined as appropriate. Furthermore, as referred to herein. "ppm" is a content (the proportion contained) on mass basis.

Creping Adhesive

The creping adhesive of the present invention contains the vinyl alcohol polymer (PVA) (A), in which at least one of (i) and (ii) below is satisfied.

(i) The PVA (A) includes a PVA having a minimum degree of branching of 0.25 or more and 0.93 or less within a range of an absolute molecular weight being 200,000 or more and 800,000 or less, and a ratio Mw/Mn of a weight-average molecular weight Mw to a number-average molecular weight Mn of the PVA (A) being 2.5 or more. (ii) The PVA (A) has a ratio Mw/Mn of a weight-average molecular weight Mw to a number-average molecular weight Mn being 3.8 or more.

The creping adhesive is favorable in a thread-forming property and wet adhesiveness. Moreover, in one embodiment of the creping adhesive, fluidity thereof is also favorable. Therefore, by using the creping adhesive in a process of producing of paper such as toilet paper, favorable crepe can be effectively imparted to the paper. Although the reasons for the thread-forming property, the wet adhesiveness, and the like being favorable in the creping adhesive are not clarified, it is speculated that, in a case in which a molecular weight distribution of the PVA (A) is broad or the PVA (A) has many branched structures, unlike common PVAs, physical properties (viscosity and the like), for example, enhanced adhesiveness to a substance to be attached may be affected when the PVA (A) is prepared into an aqueous solution. It is to be noted that, as described in detail later, a degree of branching of a polymeric molecule is a marker which represents a degree of branched structures of the polymeric molecule in a range of 0 to 1, and the value being smaller indicates the branched structures being more numerous. Each component, etc., of the creping adhesive will be described in detail below. In addition, the "PVA having a minimum degree of branching of 0.25 or more and 0.93 or less within a range of an absolute molecular weight being 200,000 or more and 800,000 or less" may be also referred to as "branched PVA".

PVA (A)

The PVA (A) is a polymer having a vinyl alcohol unit. PVA (A) satisfies at least one of the above (i) and (ii).

PVA (A) Satisfying (i)

In the case of the mode in which the above (i) is satisfied, the PVA (A) includes a branched PVA, and the ratio Mw/Mn of the weight-average molecular weight Mw to the number-average molecular weight Mn of the PVA (A) is 2.5 or more.

Branched PVA

In the branched PVA, a minimum degree of branching within a range of an absolute molecular weight being 200,000 or more and 800,000 or less is 0.25 or more and 0.93 or less. The degree of branching as referred to herein means a marker representing an extent of a branched structure(s) of a polymer, and provided that the degree of branching of a linear polymer, i.e., a polymer not having a branched structure, is 1, a value closer to 0 indicates many branched structures being included. The minimum degree of branching within a range of the absolute molecular weight being 200,000 or more and 800,000 or less is a value determined by the following procedure. With respect to a PVA as a subject of the measurement, the degree of branching for each absolute molecular weight in the range of the absolute molecular weight being 200,000 or more and 800,000 or less is determined. Then, the smallest degree of branching in the above range is defined as the minimum degree of branching.

It is to be noted that in a case in which the absolute molecular weight of a PVA is not distributed over the entire range of 200,000 or more and 800,000 or less, for example, also in a case of including only a PVA having an absolute molecular weight of 600,000 or less, or the like, the smallest degree of branching in the range of the absolute molecular weight being 200,000 or more and 600,000 or less is defined as the minimum degree of branching. In other words, although the branched PVA consisting of a plurality of molecules includes molecules having an absolute molecular weight falling within the range of 200,000 or more and 800,000 or less, the absolute molecular weight may not be distributed over the entire range of 200,000 or more and 800,000 or less. Nevertheless, the branched PVA preferably includes the PVA having an absolute molecular weight of 200,000 and the PVA having an absolute molecular weight of 800,000, and it is more preferred that the absolute molecular weight is distributed over the entire range of at least 200,000 or more and 800,000 or less.

The degree of branching $g_m$ in each absolute molecular weight of the PVA is determined with the following equations (1) and (2).

$$g'_m = [\eta]_{branch}/[\eta]_{linear} \tag{1}$$

$$g_m = g_m'^{(1/\varepsilon)} \tag{2}$$

In the equation (1). $[\eta]_{branch}$ represents an intrinsic viscosity of PVA as a subject of the measurement (branched PVA), having an absolute molecular weight x (wherein x is 200,000 or more and 800,000 or less), and is a value calculated from a differential refractive index detector, a light scattering detector, and a viscosity detector. $[\eta]_{linear}$ is an intrinsic viscosity of the linear PVA having the above absolute molecular weight x, and is similarly a value calculated from a differential refractive index detector, a light scattering detector, and a viscosity detector. It is to be noted that as the linear PVA, an unmodified PVA (a saponification product of a homopolymer of vinyl acetate) is used, a viscosity of a 4% by mass aqueous solution of which accounts for within +20% of the viscosity of a 4% by mass aqueous solution of the PVA as the subject of the measurement, and a degree of saponification of which accounts for within +3 mol % of the PVA as the subject of the measurement. The intrinsic viscosity of the PVA as the subject of the measurement and the linear PVA having each absolute molecular weight can be measured specifically, by a method described in EXAMPLES. A relationship between the degree of branching $g_m$ and the ratio $g_m'$ of the intrinsic viscosity represented by the above equation (1) is as represented by the above equation (2). In the equation (2). ¿ represents a structure factor, wherein & is 0.7.

In the branched PVA, the minimum degree of branching is 0.25 or more and 0.93 or less, forming an appropriate branched structure (crosslinking). The creping adhesive containing such a branched PVA is favorable in the thread-forming property and wet adhesiveness, and particularly tends to be superior in the thread-forming property. In order to further enhance these effects, the upper limit of the minimum degree of branching described above is preferably 0.90, more preferably 0.88, and may be still more preferably 0.8 or 0.7. On the other hand, the lower limit of the minimum degree of branching described above is preferably 0.30, and may be more preferably 0.35.

As the branched PVA, a PVA having a branched structure obtained by various conventional types of method may be used. The branched PVA can be obtained by subjecting a PVA having, for example, a crosslinkable group (a carboxy group, a silanol group, etc.) to a heat treatment, and/or the like. The above-described minimum degree of branching can be adjusted by a content of the crosslinkable group, heat treatment conditions, and the like. A specific structure of the branched PVA is exemplified by PVA (A1), described later.

The PVA (A) may include an other PVA aside from the branched PVA. The other PVA may be exemplified by an unmodified PVA not having a branched structure, as well as various types of modified PVAs not having branched structures, and the like. However, the proportion of the branched PVA contained in the PVA (A) is preferably 50% by mass or more, more preferably 70% by mass or more, and still more preferably 90% by mass or more. 99% by mass or more, or 100% by mass. In other words, it is preferred that the minimum degree of branching within a range of an absolute molecular weight being 200,000 or more and 800,000 or less in the entire PVA (A) contained in the creping adhesive is 0.25 or more and 0.93 or less. More suitable ranges of the minimum degree of branching in the PVA (A) are similar to the suitable ranges of the minimum degree of branching branched PVA described above.

PVA (A1)

The PVA (A) preferably includes the PVA (A1) which includes: a vinyl alcohol unit; and a structural unit derived from at least one selected from the group consisting of a monomer having a carboxy group, and a derivative of the monomer. Hereinafter, the "at least one selected from the group consisting of: a monomer having a carboxy group; and a derivative of the monomer" may be referred to as "monomer (a)". The PVA (A1) can form a cross-linked structure through a heat treatment, and is suitable as one example of the branched PVA. Thus, by using the PVA (A1), the thread-forming property, the wet adhesiveness, and the like of the creping adhesive can be more favorable.

The PVA (A1) is obtained, typically, by subjecting a vinyl ester polymer including the structural unit derived from the monomer (a) (a copolymer of the monomer (a) and a vinyl ester) to saponification. The derivative of the monomer having a carboxy group is exemplified by esters, anhydrides, salts, etc., of the monomer having a carboxy group. The salt of the monomer having a carboxy group, as referred to herein, means a monomer in which the carboxy group (—COOH) is present in a state of a salt (—COONa, etc.). The structural unit derived from the monomer (a) may form a cross-linked structure and bond to an other structural unit. The monomer (a) is exemplified by an ethylenic unsaturated monocarboxylic acid, an ethylenic unsaturated dicarboxylic acid, and derivatives of these. Examples of the ethylenic unsaturated monocarboxylic acid and the derivative thereof include acrylic acid, methacrylic acid, methyl acrylate, ethyl acrylate, methyl methacrylate, ethyl methacrylate, and the like.

The ethylenic unsaturated dicarboxylic acid and the derivative thereof are exemplified by ethylenic unsaturated dicarboxylic acids, a monoester thereof, a diester thereof, an anhydride thereof, and the like. Examples of the ethylenic unsaturated dicarboxylic acid include maleic acid, fumaric acid, citraconic acid, mesaconic acid, itaconic acid, and the like. Examples of the monoester of the ethylenic unsaturated dicarboxylic acid include unsaturated dicarboxylic acid monoalkyl esters such as monomethyl maleate, monoethyl maleate, monomethyl fumarate, monoethyl fumarate, monomethyl citraconate, monoethyl citraconate, monomethyl mesaconate, monoethyl mesaconate, monomethyl itaconate, and monoethyl itaconate. Examples of the diester of the ethylenic unsaturated dicarboxylic acid include unsaturated dicarboxylic acid dialkyl esters such as dimethyl maleate, diethyl maleate, dimethyl fumarate, diethyl fumarate, dimethyl citraconate, diethyl citraconate, dimethyl mesaconate, diethyl mesaconate, dimethyl itaconate, and diethyl itaconate. Examples of the anhydride of the ethylenic unsaturated dicarboxylic acid include maleic anhydride, citraconic anhydride, and the like.

In light of industrial availability, reactivity with a vinyl ester, and the like, the monomer (a) is preferably the ethylenic unsaturated dicarboxylic acid, and a monoester of the ethylenic unsaturated dicarboxylic acid, a diester of the ethylenic unsaturated dicarboxylic acid, and an anhydride of the ethylenic unsaturated dicarboxylic acid, more preferably maleic acid, a maleic acid monoalkyl ester, a maleic acid dialkyl ester, maleic anhydride, fumaric acid, a fumaric acid monoalkyl ester, and a fumaric acid dialkyl ester, and particularly preferably monomethyl maleate, dimethyl maleate, maleic anhydride, monomethyl fumarate, and dimethyl fumarate. One type, or two or more types of the monomer (a) may be used.

The lower limit of a percentage content(S) of the structural unit derived from the monomer (a) with respect to total structural units of the PVA (A1) is preferably 0.05 mol %, more preferably 0.1 mol %, and may be still more preferably 0).2 mol % or 0.3 mol %. On the other hand, the upper limit of the percentage content(S) is preferably 15 mol %, more preferably 10 mol %, still more preferably 5 mol %, and may be even more preferably 3 mol %. 2 mol %. 1 mol % or 0.5 mol %. When the percentage content(S) falls within the above range, effects achievable by modification with carboxylic acid can be sufficiently exerted, and the thread-forming property, the wet adhesiveness, the fluidity, and the like of the creping adhesive can be further improved. The percentage content(S) can be determined by a 1H-NMR analysis of a vinyl ester polymer before saponification of the PVA (A1).

The upper limit of a viscosity-average degree of polymerization (P) of the PVA (A1) may be, for example, 8,000, and is preferably 7,000, and more preferably 6,000 and may be still more preferably 5,000, 4,500 or 4,000. On the other hand, the lower limit of the viscosity-average degree of polymerization (P) may be, for example, 100 or 200, and is preferably 300, more preferably 400, and still more preferably 500 or 1,000, and may be particularly preferably 2,000, 2,500 or 3,000. In the case in which the viscosity-average degree of polymerization (P) falls within the above range, the thread-forming property, the wet adhesiveness, the fluidity, and the like of the creping adhesive tend to be more favorable. The viscosity-average degree of polymerization (P) is a value measured in accordance with JIS K6726:1994, and specifically, can be determined by a method described in EXAMPLES.

The lower limit of a percentage content of the vinyl alcohol unit with respect to total structural units in the PVA (A1) is preferably 35 mol %, more preferably 50 mol %, still more preferably 70 mol %, and may be even more preferably 80 mol % or 85 mol %. On the other hand, the upper limit of the percentage content of the vinyl alcohol unit is preferably 99.9 mol %, and more preferably 99 mol %.

The lower limit of the degree of saponification of the PVA (A1) is preferably 65 mol %, more preferably 80 mol %, and still more preferably 85 mol %. When the degree of saponification is more than or equal to the aforementioned lower limit, the wet adhesiveness and the like of the creping adhesive tends to be improved. On the other hand, the upper limit of the degree of saponification may be 100 mol %, and is preferably 99 mol %, more preferably 95 mol %, and still more preferably 92 mol %. When the degree of saponification is less than or equal to the aforementioned upper limit, a sufficient branched structure tends to be more readily formed by the heat treatment. The degree of saponification is a value measured by a method described in JIS K6726: 1994.

The PVA (A1) preferably satisfies the following inequation (I).

$$S \times P > 250 \quad \text{(I)}$$

In the inequation (I). S represents a percentage content of (mol %) of the structural unit derived from the monomer (a) with respect to total structural units; and P represents the viscosity-average degree of polymerization.

In the case in which the inequation (I) is satisfied, an extent of effects resulting from modification with the carboxylic acid (formation of a branched structure, and the like), and an extent of effects resulting from the degree of polymerization may be balanced, whereby the thread-forming property, the wet adhesiveness, the fluidity, and the like of the creping adhesive can be more favorable. The lower limit of "S×P" is more preferably 300, and may be still more preferably 400, 500, 600, or 700. On the other hand, the upper limit of "S×P" is preferably 4,000, more preferably 3,000, still more preferably 2,000, and even more preferably 1,500.

In the PVA (A1), the minimum degree of branching is preferably 0.25 or more and 0.93 or less. In other words, the PVA (A1) is preferably a branched PVA. The upper limit of the minimum degree of branching of the PVA (A1) is preferably 0.90, more preferably 0.88, and may be still more preferably 0.8 or 0.7. On the other hand, the lower limit of the minimum degree of branching of the PVA (A1) is preferably 0.30, and may be more preferably 0.35.

In regard to the degree of branching, the PVA (A1) preferably satisfies the inequation (II).

$$1.0 < g_A/g_B < 3.0 \quad \text{(II)}$$

In the inequation (II), $g_A$ represents a degree of branching of the vinyl alcohol polymer having an absolute molecular weight of 200,000 (a degree of branching of PVA having an absolute molecular weight of 200,000, of the PVA (A1)); and $g_B$ represents a degree of branching of the vinyl alcohol polymer having an absolute molecular weight of 800,000 (a degree of branching of PVA having an absolute molecular weight of 800,000, of the PVA (A1)).

In the PVA (A1), crosslinking proceeds by way of a sufficient heat treatment, whereby PVA having a minimum degree of branching being small can be obtained. However, if the degree of crosslinking is accompanied by nonuniformity due to the difference in the molecular weight. PVA (in general, a component having a molecular weight being large) in which crosslinking excessively occurs is likely to be insoluble in water, and affects fluidity and the like of the creping adhesive. Further, when the nonuniformity of crosslinking is great due to the difference in the molecular weight, the ratio g/gr becomes greater. From this point of view, the ratio $g_A/g_B$ is more preferably less than 2.7, and still more preferably less than 2.4.

The value of the ratio $g_A/g_B$ tends to increase as a proportion of the PVA, in which excessive crosslinking has occurred through being excessively heated, increases. Thus, as described later, the ratio $g/g_B$ can be lowered by: at the time of subjecting the saponification product of the vinyl ester polymer (copolymer) to a heat treatment, eliminating beforehand a fine powder which is likely to be excessively heated; carrying out the heat treatment while eliminating the fine powder; eliminating the fine powder after the heat treatment; and/or the like.

The PVA (A1) may include other structural unit(s) aside from: the vinyl alcohol unit: a vinyl ester unit; and the structural unit derived from the monomer (a). Examples of monomers that give the other structural unit include: α-olefins such as ethylene, propylene, 1-butene, isobutene, and 1-hexene: acrylamide derivatives such as N-methylacrylamide. N-ethylacrylamide, and 2-acrylamide-2-methylpropane sulfonate; methacrylamide derivatives such as N-methylmethacrylamide and N-ethylmethacrylamide; vinyl ethers such as methyl vinyl ether, ethyl vinyl ether, n-propyl vinyl ether, isopropyl vinyl ether, and n-butyl vinyl ether: hydroxy group-containing vinyl ethers such as ethylene glycol vinyl ether, 1,3-propanediol vinyl ether, and 1,4-butanediol vinyl ether; allyl acetate: 3,4-diacetoxy-1-butene: allyl ethers such as propyl allyl ether, butyl allyl ether, and hexyl allyl ether: monomers each having an oxyalkylene group: hydroxy group-containing α-olefins such as 3-buten-1-ol, 4-penten-1-ol, 5-hexen-1-ol, 7-octen-1-ol, 9-decen-1-ol, and 3-methyl-3-buten-1-ol: monomers each having a silyl group such as vinyltrimethoxysilane, vinylmethyldimethoxysilane, vinyldimethylmethoxysilane, vinyltriethoxysilane, vinylmethyldiethoxysilane, vinyldimethylethoxysilane, 3-(meth)acrylamidepropyltrimethoxysilane, and 3-(meth)acrylamidepropyltriethoxysilane; and the like.

A percentage content of the other structural unit with respect to the total structural units of the PVA (A1) may be preferably 20 mol % or less, may be more preferably 10 mol % or less, and may be still more preferably 3 mol % or less. 1 mol % or less, or 0.1 mol % or less. On the other hand, the percentage content of the other structural unit may be, for example, 0.1 mol % or more, and may be 1 mol % or more.

The PVA (A) may include an other PVA aside from the PVA (A1). The other PVA may be exemplified by conventionally well-known PVAs such as unmodified PVAs, as well as various types of modified PVAs, and the like. Nevertheless, the proportion of the PVA (A1) contained in the PVA (A) is preferably 50% by mass or more, more preferably 70% by mass or more, and still more preferably 90% by mass or more. 99% by mass or more, or 100% by mass. In other words, the PVA (A) is preferably the PVA (A1) having a minimum degree of branching of 0.25 or more and 0.93 or less within a range of an absolute molecular weight being 200,000 or more and 800,000 or less.

Method for Producing PVA (A1)

The PVA (A1) can be suitably obtained by a production method including:

- a step (1) of obtaining a copolymer of a vinyl ester with the monomer (a);
- a step (2) of obtaining a saponification product of the copolymer; and
- a step (3) of subjecting the saponification product to a heat treatment.

Step (1)

In the step (1), a copolymer of a vinyl ester with the monomer (a) is obtained. Specific examples and preferred examples of the monomer (a) are as described above. Examples of the vinyl ester monomer include vinyl formate, vinyl acetate, vinyl propionate, vinyl valerate, vinyl caprate, vinyl laurate, vinyl stearate, vinyl benzoate, vinyl pivalate, vinyl versatate, and the like. Of these, vinyl acetate is preferred.

The procedure of polymerization is exemplified by a well-known procedure such as a bulk polymerization procedure, a solution polymerization procedure, a suspension polymerization procedure, an emulsion polymerization procedure, and the like. Of these procedures, the bulk polymerization procedure performed without a solvent and the solution polymerization procedure performed with a solvent such as an alcohol or the like are preferred, and the solution polymerization procedure in which the polymerization is performed in the presence of a lower alcohol is more preferred. The lower alcohol is preferably an alcohol having 3 or fewer carbon atoms; more preferably methanol, ethanol, n-propanol, or isopropanol; and still more preferably methanol. In carrying out a polymerization reaction by the bulk polymerization procedure or the solution polymerization procedure, in terms of a reaction system, either of a batch-wise system or a continuous system can be employed.

An initiator to be used in the polymerization reaction is exemplified by well-known initiators, e.g., azo initiators such as 2,2-azobisisobutyronitrile, 2,2-azobis(2,4-dimethylvaleronitrile), and 2,2-azobis(4-methoxy-2,4-dimethylvaleronitrile): organic peroxide initiators such as benzoyl peroxide and n-propyl peroxycarbonate; and the like. A polymerization temperature at a time of conducting the polymerization reaction is not particularly limited, and a range of 5° C. or higher and 200° C. or lower is appropriate.

In copolymerizing the vinyl ester with the monomer (a), copolymerizable monomer(s) can be further copolymerized within a range not impairing the principles of the present invention. Specific examples of such other monomer(s) are as described above, in terms of the monomer that gives the other structural unit.

In the copolymerization, a chain transfer agent may also be present for the purpose of adjusting the degree of polymerization of the resulting PVA, and the like. Examples of the chain transfer agent include: aldehydes such as acetaldehyde, propionaldehyde, butyraldehyde, and benzaldehyde: ketones such as acetone, methyl ethyl ketone, hexanone, and cyclohexanone: mercaptans such as 2-hydroxyethanethiol and 3-mercaptopropionic acid: thiocarboxylic acids such as thioacetic acid: halogenated hydrocarbons such as trichloroethylene and perchloroethylene; and the like. Of these, the aldehydes and the ketones are particularly suitably used. An amount of the chain transfer agent to be added is determined according to the chain transfer constant of the chain transfer agent to be added and the target degree of polymerization of the PVA. Typically, the amount is preferably 0.1 to 10% by mass with respect to the vinyl ester to be used.

Step (2) In the step (2), the copolymer (vinyl ester polymer) obtained in the step (1) is saponified in a solution using an alkali catalyst or an acid catalyst to give the saponification product. For the saponification reaction, an alcoholysis or hydrolysis reaction using a conventionally well-known basic catalyst such as sodium hydroxide, potassium hydroxide, or sodium methoxide, or an acid catalyst such as p-toluenesulfonic acid can be adopted. Examples of the solvent to be used in the saponification reaction include: alcohols such as methanol and ethanol: esters such as methyl acetate and ethyl acetate: ketones such as acetone and methyl ethyl ketone: aromatic hydrocarbons such as benzene and toluene; and the like. These can be used alone, or in a combination of two or more types thereof. Of these, due to convenience, it is preferable to use methanol or a mixed solution of methanol and methyl acetate as the solvent, and to conduct the saponification reaction in the presence of sodium hydroxide, which serves as the basic catalyst.

The saponification reaction can be conducted using a belt type reactor, a kneader type reactor, a tower type reactor, or the like. A temperature at which saponification is conducted is not particularly limited, and is preferably 20° C. or higher and 60° C. or lower. In a case in which a gelatinous product emerges to deposit as the saponification proceeds, it is preferred that the product is pulverized and the saponification is allowed to further proceed. Thereafter, a resultant solution is neutralized to terminate the saponification and washed, whereby a saponification product can be obtained. A procedure for the saponification is not limited to the procedure described above, and a well-known procedure can be employed.

Step (3)

In the step (3), the saponification product obtained after the step (2) is subjected to a heat treatment. The heat treatment is preferably carried out in an air atmosphere or a nitrogen atmosphere. The heat treatment is preferably carried out on the saponification product being in a solid form, and more preferably on the saponification product being in a powder form (particulate form). The saponification product may be preliminarily dried, and the saponification product from which a certain level of volatile matter has been removed may be subjected to the heat treatment. The heat treatment may be carried out while stirring the saponification product. The heat treatment can be carried out by using, for example, a cylindrical agitating dryer, or the like.

In the production of the PVA (A1), the heat treatment is preferably carried out with a heat treatment temperature of 100° C. or higher and a heat treatment time period of 1 hour or longer. By carrying out the heat treatment under such a condition, a sufficient crosslinking reaction is caused, whereby the minimum degree of branching of the PVA (A1) to be obtained can be decreased. The lower limit of the heat treatment temperature may be 105° C. 110° C. 115° C. or 120° C. Further, the upper limit of the heat treatment temperature may be 150° C. or may be 140° C. 130° C. or 125° C. The lower limit of the heat treatment time period is preferably 2 hrs. more preferably 3 hrs, and still more preferably 4 hrs. Further, the upper limit of the heat treatment time period may be 12 hrs. may be 8 hrs, or may be 5.5 hrs. When the heat treatment temperature and the heat treatment time period are each less than or equal to the aforementioned upper limits, formation of excessive crosslinking can be inhibited.

Ratio Mw/Mn

In the case of the mode in which the above (i) is satisfied, the ratio Mw/Mn of a weight-average molecular weight Mw to a number-average molecular weight Mn of the PVA (A) is 2.5 or more. The lower limit of the ratio Mw/Mn is preferably 3.0, more preferably 3.8, still more preferably 4.5, and even more preferably 5.0, 5.5, or 6.0. When the ratio Mw/Mn is more than or equal to the lower limit, the thread-forming property, the wet adhesiveness, the fluidity, and the like of the creping adhesive tend to be further improved. On the other hand, the upper limit of the ratio Mw/Mn may be, for example, 20, or may be 15. The ratio Mw/Mn of the PVA (A) is a value based on the entire PVA (A) contained in the creping adhesive.

The number-average molecular weight Mn and the weight-average molecular weight Mw of the PVA (A) may be determined by a gel permeation chromatography (GPC) measurement using polymethacrylic acid as a standard substance. Specifically, they can be determined by the methods described in EXAMPLES.

PVA (A) Satisfying (ii)

In the case of the mode in which the above (ii) is satisfied, the ratio Mw/Mn of a weight-average molecular weight Mw to a number-average molecular weight Mn of the PVA (A) is 3.8 or more. The lower limit of the ratio Mw/Mn is preferably 4.5, and more preferably 5.0, 5.5, or 6.0. When the ratio Mw/Mn is more than or equal to the lower limit, the thread-forming property, the wet adhesiveness, the fluidity, and the like of the creping adhesive tend to be further improved. On the other hand, the upper limit of the ratio Mw/Mn may be, for example, 20, may be 15, or may be 10, 8, or 6. The ratio Mw/Mn of the PVA (A) is a value based on the entire PVA (A) contained in the creping adhesive.

In the mode in which the above (ii) is satisfied, a conventionally well-known unmodified PVA, or any of various types of modified PVAs can be used as the PVA (A). The modified PVA typically has a structural unit derived from other monomer aside from vinyl esters. The other monomer is exemplified by monomers and the like, exemplified as the monomers that give other structural units which may be included in the PVA (A1). The PVA (A) can be produced by a conventionally well-known method. In addition, the PVA (A) wherein (i) above is satisfied and has the ratio Mw/Mn of 3.8 or more is also involved in this mode.

In the mode in which the above (ii) is satisfied, the PVA (A) is preferably a mixture of two or more types of PVAs that are different from one another in terms of at least one of the number-average molecular weight and the viscosity-average degree of polymerization. In such a case, the PVA (A) having a ratio Mw/Mn of 3.8 or more is likely to be obtained due to expanded distribution of the molecular weight. The PVA (A) may, for example, have two or more peaks in a distribution curve of the molecular weight. PVAs corresponding to respective peaks can be recognized as the PVAs that are different from one another in terms of at least one of the number-average molecular weight and the viscosity-average degree of polymerization. In a case in which the PVA (A) is obtained by mixing the two types of PVAs that are different from one another in terms of at least one of the number-average molecular weight and the viscosity-average degree of polymerization, the mixing ratio (mass ratio) can be set such that the molecular weight distribution expands, and is, for example, preferably 10:90 to 90:10, and more preferably 30:70 to 70:30. It is to be noted that three or more types of PVAs that are different from one another in terms of at least one of the number-average molecular weight and the viscosity-average degree of polymerization may be mixed and used.

The degree of saponification of at least one PVA of the two or more types of PVAs that are different from one another in terms of at least one of the number-average molecular weight and the viscosity-average degree of polymerization is preferably 65 mol % or more and 99 mol % or less. The lower limit of the degree of saponification is more preferably 70 mol %, and still more preferably 80 mol %. The upper limit of the degree of saponification is more preferably 95 mol %, and still more preferably 92 mol %. When the PVA having such a degree of saponification is used, the thread-forming property, the wet adhesiveness, the fluidity, and the like of the creping adhesive may be more improved.

Even in the case in which either of (i) or (ii) above is satisfied, the upper limit of the viscosity-average degree of polymerization (P) of the PVA (A) may be, for example, 8,000, and is preferably 7,000, more preferably 6,000, and may be even more preferably 5,000, 4,500 or 4,000. On the other hand, the lower limit of the above-described viscosity-average degree of polymerization (P) may be, for example, 100 or 200, and is preferably 300, more preferably 400, still more preferably 500 or 1,000, and may be particularly preferably 2,000, 2,500 or 3,000. When the viscosity-average degree of polymerization (P) falls within this range, the thread-forming property, the wet adhesiveness, the fluidity, and the like of the creping adhesive tends to be more favorable.

Even in the case in which either of (i) or (ii) above is satisfied, the lower limit of a percentage content of the vinyl alcohol unit with respect to total structural units in the PVA (A) is preferably 35 mol %, more preferably 50 mol %, still more preferably 70 mol %, and may be even more preferably 80 mol % or 85 mol %. On the other hand, the upper limit of the percentage content of the vinyl alcohol unit is preferably 99.9 mol %, and more preferably 99 mol %.

Even in the case in which either of (i) or (ii) above is satisfied, the lower limit of the degree of saponification of the PVA (A) is preferably 65 mol %, more preferably 80 mol %, and still more preferably 85 mol %. On the other hand, the upper limit of the degree of saponification may be 100 mol %, and is preferably 99 mol % and more preferably 95 mol %, or may be still more preferably 92 mol %.

Even in the case in which either of (i) or (ii) above is satisfied, the lower limit of a content of the PVA (A) in the solid content in the creping adhesive of the present invention is preferably 20% by mass and more preferably 40% by mass, or may be still more preferably 60% by mass or 80% by mass. On the other hand, the upper limit of the content may be 100% by mass, or may be preferably 80% by mass or 60% by mass. When the content of the PVA (A) is more than or equal to the lower limit, the effects achievable due to the PVA (A) can be particularly sufficiently exhibited, and the thread-forming property, the wet adhesiveness, the fluidity, and the like of the creping adhesive can be enhanced. On the other hand, when the content of the PVA (A) is equal to or less than the above-described upper limit, due the effect of combination with other component(s) (for example, polyamide resin (B) described later, and/or the like), wet adhesiveness and/or the like may be enhanced, whereby forming a more favorable crepe, and the like tend to be enabled. It is to be noted that the solid content as referred to herein means components other than a solvent and any component having a normal boiling point of 100° C. or less.

Polyamide Resin (B)

The creping adhesive of the present invention preferably further contains the polyamide resin (B). When the creping adhesive further contains the polyamide resin (B), the wet adhesiveness of the creping adhesive can be enhanced. The polyamide resin (B) preferably has a functional group (for example, an epoxy group, an amino group, a group derived therefrom, or the like) having reactivity such as adhesiveness or crosslinkability, and more preferably an epoxy group or a group derived from an epoxy group.

The polyamide resin (B) is preferably exemplified by a polyamideepihalohydrin resin (a polyamideepichlorohydrin resin or the like), a polyamidepolyamine-epihalohydrin resin (a polyamidepolyamineepichlorohydrin resin or the like), a polyamidepolyaminepolyureaepihalohydrin resin (a polyamidepolyaminepolyureaepichlorohydrin resin or the like), a polyamidepolyamine resin, and the like. Of these, the polyamidepolyamine-epihalohydrin resin is preferred, and the polyamidepolyamineepichlorohydrin resin is more preferred. One type, or two or more types of the polyamide resin (B) can be used.

The lower limit of a content of the polyamide resin (B) in the solid content in the creping adhesive of the present invention is preferably 5% by mass and more preferably 10% by mass, or may be still more preferably 20% by mass. On the other hand, the upper limit of the content is preferably 80% by mass and more preferably 60% by mass, or may be still more preferably 40% by mass. When the content of the polyamide resin (B) falls within the above range, combination with the PVA (A) may enable enhancing the thread-forming property, the wet adhesiveness, the fluidity, and the like of the creping adhesive.

Defoaming Agent (C)

The creping adhesive of the present invention preferably further contains the defoaming agent (C). Accordingly, forming of the creping adhesive can be inhibited, whereby the thread-forming property, the wet adhesiveness, the fluidity, and the like can be enhanced. In addition, as described later, in a case in which the powder for use as a creping adhesive contains the defoaming agent (C), solubility of the powder increases, thereby decreasing the insoluble content, and as a result, wet adhesiveness of the creping adhesive tends to be enhanced.

Examples of the defoaming agent (C) include:

alcohol-based compounds such as methanol, ethanol, isopropanol, butanol. 2-ethylhexanol, diisobutyl carbinol, amyl alcohol, and Guerbet alcohols (preferably Guerbet alcohol having 8 to 12 carbon atoms, more preferably Guerbet alcohol having 10 carbon atoms);

silicone-based compounds such as silicone oil;

anionic surfactants such as alkylsulfonic acid salts, alkylsulfuric acid ester salts, alkyl phosphoric acid ester salts, polyoxyalkylene alkylphosphoric acid ester salts, polyoxyalkylene alkylsulfuric acid ester salts, polyoxyalkylene alkylarylsulfuric acid ester salts, polyoxyalkylene aralkylarylsulfuric acid ester salts, and alkyl-arylsulfonic acid salts;

nonionic surfactants such as sorbitan fatty acid esters and polyalkyleneoxide adducts thereof, glycerin fatty acid esters, various types of polyalkyleneoxide type nonionic surfactants (polyoxyalkylene fatty acid esters, polyoxyalkylene fatty acid amides, polyoxyalkylene alkyl ether, polyoxyalkylene aliphatic amine, polyoxyalkylene aliphatic mercaptan, polyoxyalkylene alkyl aryl ether, polyoxyethylene polyoxypropylene block polymers, polyoxvalkylene aralkyl aryl ether, and the like), various types of acetylene glycol-based nonionic surfactant (compound represented by formula (A)); and the like. One type, or two or more types of the defoaming agent (C) may be used.

(A)

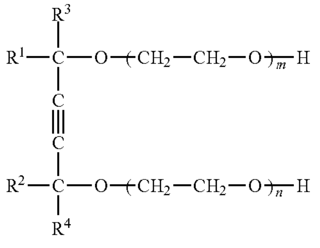

In the formula (A), m and n may be identical or different, and are each an integer of 0) or more that satisfies an equation of m+n=1 to 15. In the formula (A), $R^1$, $R^2$, $R^3$ and $R^4$ each may be identical or different, and are a linear or branched alkyl group having having 1 to 5 carbon atoms.

The defoaming agent (C) is preferably at least one selected from the group consisting of the nonionic surfactant and the anionic surfactant, and more preferably the nonionic surfactant.

The lower limit of a content of the defoaming agent (C) with respect to the PVA (A) in the creping adhesive of the present invention is preferably 10 ppm, more preferably 100 ppm, and still more preferably 300 ppm. On the other hand, the upper limit of the content is preferably 30,000 ppm, more preferably 10,000 ppm, and still more preferably 3,000 ppm. When the content of the defoaming agent (C) falls within the above range, the function of the defoaming agent (C) can be sufficiently exhibited, and the thread-forming property, the wet adhesiveness, the fluidity, and the like can be more enhanced.

In addition, it is also preferred that the creping adhesive of the present invention contains at least one surfactant (C') selected from the group consisting of a nonionic surfactant and an anionic surfactant. The surfactant (C') is more preferably the nonionic surfactant. Specific examples of the nonionic surfactant and the anionic surfactant as the surfactant (C') are similar to those exemplified as the defoaming agent (C). A suitable content of the surfactant (C') is similar to the content of the defoaming agent (C). Other Components and the like The creping adhesive of the present invention is typically an aqueous solution in which the PVA (A) and optional component(s), being the polyamide resin (B), the defoaming agent (C), and/or the like, are dissolved in water as a solvent. The creping adhesive may further contain as solid content, other component(s) aside from the PVA (A), the polyamide resin (B), and the defoaming agent (C). The other component(s) is/are exemplified by a mineral oil, silica, a plasticizer, a pH adjusting agent, a release agent, and the like. A content of the other component aside from the PVA (A), the polyamide resin (B), and the defoaming agent (C) in the solid content of the creping adhesive is preferably 10% by mass or less, or may be preferably 1% by mass or less or 0.1% by mass or less. In the case in which the creping adhesive is the aqueous solution, a solvent other than water may be further contained.

In the case in which the creping adhesive is an aqueous solution, the lower limit of a solid content concentration is preferably 1% by mass, more preferably 2% by mass, and still more preferably 3% by mass. On the other hand, the upper limit of this solid content concentration is preferably 20% by mass, more preferably 15% by mass, and still more preferably 10% by mass. When the solid content concentration in the creping adhesive falls within the above-described range, the fluidity, the thread-forming property, and the like may be further optimized.

Powder for Use as Creping Adhesive

The powder for use as a creping adhesive of the present invention contains the PVA (A), and at least one of (i) and (ii) below is satisfied. Hereinafter, the "powder for use as a creping adhesive" may be also referred to as merely "powder".

(i) The PVA (A) includes a PVA having a minimum degree of branching of 0.25 or more and 0.93 or less within a range of an absolute molecular weight being 200,000 or more and 800,000 or less, and a ratio Mw/Mn of a weight-average molecular weight Mw to a number-average molecular weight Mn of the PVA (A) is 2.5 or more.

(ii) The ratio Mw/Mn of the weight-average molecular weight Mw to the number-average molecular weight Mn of the PVA (A) is 3.8 or more.

By dissolving the powder of the present invention in water, the creping adhesive of the present invention described above can be obtained. In other words, from the powder, a creping adhesive favorable in the thread-forming property, the wet adhesiveness, and the like can be obtained. Moreover, the powder is also favorable in water solubility.

A specific mode and a suitable mode of the PVA (A) included in the powder are similar to the specific mode and the suitable mode of the PVA (A) contained in the creping adhesive of the present invention.

The powder may be a powder that substantially consists of only the PVA (A). The lower limit of a content of the PVA (A) in the powder is preferably 90% by mass, more preferably 99% by mass, and still more preferably 99.9% by mass. The upper limit of this content may be 100% by mass.

It is preferred that the powder further contains the defoaming agent (C). In the case in which the powder contains the defoaming agent (C), solubility of the powder in water is enhanced and thus the insoluble content decreases, whereby consequently, wet adhesiveness and/or the like of the obtained creping adhesive tend(s) to be enhanced. The defoaming agent (C) is preferably at least one selected from the group consisting of the nonionic surfactant and the anionic surfactant, and more preferably the nonionic surfactant. For the reason similar to that for the defoaming agent (C), it is also preferred that the powder contains the surfactant (C') such as at least one selected from the group consisting of the nonionic surfactant and the anionic surfactant. The surfactant (C') is more preferably the nonionic surfactant.

In the powder, the PVA (A) and the defoaming agent (C) or the surfactant (C') may be in a state of being admixed together: however, the defoaming agent (C) or the surfactant (C') is preferably present such that adhesion to the surface of the PVA (A) particles is attained. In the case of such a mode, an insoluble content in the powder more decreases, whereby wet adhesiveness of a resultant creping adhesive tends to be more enhanced. Although the reason for this advantage is not certain, it is speculated that, for example, the presence of the defoaming agent (C) or the surfactant (C') on the surface of each particle leads to an increase in dispersibility of each particle in water, whereby dissolution is promoted. It is to be noted that in the powder, particles of the PVA (A) to which the defoaming agent (C) or the surfactant (C') is not adhered may be present, and/or particles each consisting of the defoaming agent (C) or the surfactant (C') alone may be also present.

A suitable range of a content of the defoaming agent (C) or the surfactant (C'') in the powder is similar to the suitable range of the content of the defoaming agent (C) or the surfactant (C') in the creping adhesive described above.

The powder may further contain other component(s) aside from the PVA (A) and the defoaming agent (C). The other component(s) in the powder is/are exemplified by those exemplified as other components in creping adhesives, and the like. However, in general, the polyamide resin (B) and the like are added together with the water when a creping adhesive as an aqueous solution is prepared. Therefore, the powder may substantially consist of only the PVA (A) and the defoaming agent (C). The lower limit of a total content of the PVA (A) and the defoaming agent (C) in the powder is preferably 90% by mass, more preferably 99% by mass, and still more preferably 99.9% by mass. The upper limit of the total content may be 100% by mass.

In the powder, the upper limit of a percentage content of the powder capable of passing through a sieve having a mesh opening size of 180 μm (fine powder) is preferably 12% by mass, and may be more preferably 10% by mass. 8% by mass, or 5% by mass. The powder may be obtained by undergoing a heat treatment as the method for producing the PVA (A1) described above. However, fine powder is likely to be excessively heated by the heat treatment, leading to crosslinking excessively proceeding, whereby the insoluble matter is more likely to be formed. In the case of an increase in the amount of the insoluble matter, lowering of the wet adhesiveness, the fluidity, and the like of the creping adhesive may occur. Thus, when the percentage content of the powder capable of passing through a sieve having a mesh opening size of 180 μm is set to be less than or equal to the upper limit, the insoluble matter decreases, whereby the wet adhesiveness, the fluidity, and the like of the resultant creping adhesive are improved. It is to be noted that the lower limit of the percentage content of the powder capable of passing through a sieve having a mesh opening size of 180 μm may be 0.1% by mass, or may be 1% by mass. The mesh opening size of the sieve is in accordance with nominal mesh opening size W in JIS Z8801-1:2006 (the same applies herein below).

In the powder, it is preferred that the percentage content of the powder capable of passing through a sieve having a mesh opening size of 1.00 mm is 97% by mass or more, and the percentage content of the powder capable of passing through a sieve having a mesh opening size of 500 μm is 40% by mass or more. The lower limit of the percentage content of the powder capable of passing through a sieve having a mesh opening size of 1.00 mm is more preferably 98% by mass, and still more preferably 99% by mass. On the other hand, the upper limit of the percentage content of the powder capable of passing through a sieve having a mesh opening size of 1.00 mm may be 100% by mass, or may be 99.9% by mass. The upper limit of the percentage content of the powder capable of passing through a sieve having a mesh opening size of 500 μm may be 70% by mass, or may be 60% by mass. In the case in which the powder has such a size, due to a smaller amount of coarse powder, the uniformity of the particle diameter being superior, etc., high solubility in water can be attained, whereby the fluidity and the like of the resultant creping adhesive may be improved.

Particle size distribution in the powder can be adjusted by sieving and/or the like during or following the production.

An insoluble content determined after adding 4 parts by mass of the powder to 96 parts by mass of water, followed by stirring the mixture at 150 rpm and 60° C. for 1 hour may be, for example, 0.1 ppm or more and 5000 ppm or less, and is preferably 0.1 ppm or more and less than 2,000 ppm. The above-described insoluble content is more preferably less than 1.800 ppm, and still more preferably less than 1.600 ppm. Due to the insoluble matter being contained in a small amount, the fluidity, the wet adhesiveness, and the like of the creping adhesive obtained from the powder can be enhanced. On the other hand, the insoluble content may be 1 ppm or more, or may be 10 ppm or more or 100 ppm or more. The insoluble content can be, specifically, determined by the method described in EXAMPLES.

In the powder, as described above, the insoluble matter can be decreased by avoiding an excessive heat treatment, eliminating fine powder, allowing the defoaming agent (C) to be contained, and/or the like.

The powder can be produced according to a method for producing a conventionally well-known powdery PVA. In producing the powder, a step of subjecting the powder to a heat treatment, a step of sieving the powder, a step of eliminating fine powder, and the like may be carried out. Furthermore, in producing the powder, a step of allowing the defoaming agent (C) to be adhered to the powder surface of the PVA (A) by, for example, mixing the PVA (A) powder with the defoaming agent (C), and/or the like may be also carried out.

Method for Producing Creping Adhesive

The method for producing a creping adhesive of the present invention includes a step of dissolving a PVA (A) in water, wherein at least one of (i) and (ii) below is satisfied.

(i) The PVA (A) includes a PVA having a minimum degree of branching of 0.25 or more and 0.93 or less within a range of an absolute molecular weight being 200,000 or more and 800,000 or less, and a ratio Mw/Mn of a weight-average molecular weight Mw to a number-average molecular weight Mn of the PVA (A) is 2.5 or more.

(ii) The ratio Mw/Mn of the weight-average molecular weight Mw to the number-average molecular weight Mn of the PVA (A) is 3.8 or more.

According to the production method, a creping adhesive favorable in the thread-forming property, the wet adhesiveness, and the like can be obtained. A specific mode and a suitable mode of the PVA (A) used in the production method are similar to the specific mode and the suitable mode of the PVA (A) contained in the creping adhesive of the present invention. However, the PVA (A) before dissolution to be used in the production method is typically powder. In other words, in the production method, the powder for use as a creping adhesive of the present invention can be suitably used as the PVA (A) to be dissolved in water.

Furthermore, in the production method, a mixture of two or more types of PVAs that are different from one another in terms of at least one of the number-average molecular weight and the viscosity-average degree of polymerization is preferably used as the PVA (A) to be dissolved in water. More specifically, the creping adhesive may be prepared by dissolving in water, two or more types of PVAs that are different from one another in terms of at least one of the number-average molecular weight and the viscosity-average degree of polymerization. By conducting such a procedure, the creping adhesive containing the PVA (A) satisfying the above (ii) may be more easily prepared.

In the step of dissolving a PVA (A) in water, use of warm water as the water, or carrying out the step while heating the water is preferred, in light of decreasing the insoluble matter, and the like. The temperature of the water in this step can be, for example, 50° C. or more and 95° C. or less. In this step, component(s) other than the PVA (A), such as the polyamide resin (B), may be dissolved in the water together with the PVA (A). Alternatively, in this step, in the case in which the powder containing the defoaming agent (C) with the PVA (A) is not used, and/or the like, the defoaming agent (C) powder is added to the water separately from the PVA (A) powder, followed by allowing for dissolution of the same.

Toilet Paper. Tissue Paper. Paper Towel. Kitchen Paper. or Napkin Base Paper

The toilet paper, the tissue paper, the paper towel, the kitchen paper, or the napkin base paper of the present invention is produced by using the creping adhesive of the present invention. Hereinafter. "toilet paper, tissue paper, paper towel, kitchen paper, or napkin base paper" may be also referred to as a "paper product".

Since the paper product of the present invention is produced by using the creping adhesive of the present invention, the paper product has favorable crepes formed, and is bulky and has favorable flexibility. The paper product can be produced by a method similar to that for a conventionally well-known paper product, except that the creping adhesive of the present invention is used for the production.

The paper product is produced by carrying out the creping using the creping adhesive of the present invention. The method for producing the paper product includes, for example:

- a step of drying wet paper by attaching to a surface of a cylindrical dryer; and
- a step of scraping the paper, which was dried by the above-described step, from the dryer surface using a doctor blade.

In the step of drying, the creping adhesive is applied beforehand on the dryer surface. Accordingly, a coating film of the creping adhesive is formed on the dryer surface. Alternatively, in the step of drying, the creping adhesive may be applied on the wet paper beforehand. However, in order for the effects of the creping adhesive to be sufficiently exerted, applying the creping adhesive on the dryer surface is preferred. Applying the creping adhesive can be performed by spraying or the like.

The wet paper in the step of drying may be an undried wet web obtained by sheet-making. Further, as the cylindrical dryer, a Yankee dryer is widely used. The dried paper after undergoing the step of drying is scraped from the dryer surface with a doctor blade, whereby crepes are formed on the paper. The production method may further include a step of sheet-making, a step of scraping the paper having the crepes formed, and the like.

To the paper product thus produced, typically, the PVA contained in the creping adhesive is adhered. In other words, the paper product containing the PVA (A), wherein at least one of (i) and (ii) below is satisfied, is also involved in the present invention.

(i) The PVA (A) includes a PVA having a minimum degree of branching of 0.25 or more and 0.93 or less within a range of an absolute molecular weight being 200,000 or more and 800,000 or less, and a ratio Mw/Mn of a weight-average molecular weight Mw to a number-average molecular weight Mn of the PVA (A) is 2.5 or more.

(ii) The ratio Mw/Mn of the weight-average molecular weight Mw to the number-average molecular weight Mn of the PVA (A) is 3.8 or more.

A specific mode and a suitable mode of the PVA (A) included in the paper product are similar to the specific mode and the suitable mode of the PVA (A) contained in the creping adhesive of the present invention. The paper product also has favorable crepes formed, and is bulky and has favorable flexibility. Components other than the PVA (A) in the paper product may be similar to components of conventionally well-known paper products.

EXAMPLES

Hereinafter, the present invention is specifically explained by way of Examples, but the present invention is not in any way limited to these Examples. It is to be noted that in the following Examples and Comparative Examples. "part(s)" and "%" are on mass basis, unless otherwise specified particularly. Each measuring method adopted in the following Examples and Comparative Examples is indicated below.

Viscosity-AverageDegree of Polymerization

The viscosity-average degree of polymerization of the PVA was determined according to JIS K6726:1994. Specifically, the PVA was saponified until the degree of saponification became 99.5 mol % or more, and after being purified: in regard to the PVA including the structural unit derived from the monomer (a), a limiting viscosity [η] (unit: liter/g) was measured in an aqueous sodium chloride solution (0.5 mol/L) at 30° C.; and in regard to the PVA not including the structural unit derived from the monomer (a), a limiting viscosity [η] (unit: liter/g) was measured in an aqueous solution at 30° C. From this limiting viscosity [η], the viscosity-average degree of polymerization (P) of the PVA was determined according to the following equation.

$$P = ([\eta] \times 10^4 / 8.29)^{(1/0.62)}$$

Degree of Saponification

The degree of saponification of each PVA was determined according to a method described in JIS K6726:1994.

Percentage Content of Structural Unit Derived from Monomer (a) (Degree of Modification)

A percentage content of the structural unit derived from the monomer (a) in the PVA (a degree of modification) was determined according to a method employing 1H-NMR, using a vinyl ester polymer that is a precursor of the PVA.

For example, when monomethyl maleate is used as the monomer (a), the degree of modification may be determined according to the following procedure. More specifically: by using n-hexane/acetone as a solvent, the vinyl ester polymer that is the precursor of the PVA is precipitated and purified sufficiently at least three times, and thereafter the purified material thus obtained is dried at 70° C. for 1 day to produce a sample for analysis. The sample is dissolved in $CDCl_3$, and the measurement is carried out with 1H-NMR at room temperature. The degree of modification (the percentage content S of the structural unit derived from the monomer (a)) can be calculated from a peak α (4.7 to 5.2 ppm) derived from a methine structure of the vinyl ester unit in the vinyl ester polymer, and a peak β (3.6 to 3.8 ppm) derived from the methyl group of the methyl ester moiety of the structural unit derived from the monomer (a), according to the following equation:

$$S(\text{mol }\%) = \{(\text{number of protons of } \beta/3) / (\text{number of proton of } \alpha + (\text{number of proton of } \beta/3))\} \times 100.$$

Ratio Mw/Mn

In regard to the PVA, a weight-average molecular weight (Mw) and a number-average molecular weight (Mn) were determined in terms of a polymethyl methacrylate equivalent value by a gel permeation chromatography (GPC) measurement using hexafluoroisopropanol as a mobile phase, and with a differential refractive index detector. Then, a ratio Mw/Mn of these was determined. Specifically, the following conditions were adopted.

- GPC column: “GMHHR(S)” manufactured by Tosoh Corporation×2
- mobile phase: hexafluoroisopropanol (containing trifluorosodium acetate at a concentration of 20 mmol/L)
- flow rate: 0.2 mL/min
- sample concentration: 0.100 wt/vol %
- amount of injected sample: 10 μL
- detector: differential refractive index detector
- standard substance: polymethacrylic acid (“EasiVial PMMA 4 mL tri-pack” manufactured by Agilent Technologies)

Degree of Branching

First, with hexafluoroisopropanol as a mobile phase, gel permeation chromatography (GPC) measurement was performed by using a differential refractive index detector, a light scattering detector, and a viscosity detector to determine intrinsic viscosity on each absolute molecular weight of 200,000 or more and 800,000 or less of: the PVA (branched PVA) as a subject of the measurement; and the linear PVA serving as a corresponding standard. It is to be noted that the linear PVA used was an unmodified PVA having a viscosity of a 4% by mass aqueous solution falling within +20%, and a degree of saponification falling within +3 mol %, of the PVA as the subject of the measurement.

Specific measurement conditions of GPC are as shown below.

- solvent: hexafluoroisopropanol (containing sodium trifluoroacetate at a concentration of 20 mmol/L)
- column: Shodex (registered trademark) FIP-806M, manufactured by Showa Denko K.K., ×2, and HFIP-LG×1
- column temperature: 40° C.
- flow rate: 1.0 mL/min
- sample concentration: 0.1 mass/vol %
- amount of injection: 100 μL
- authentic sample:
  - for relative molecular weight: polymethyl methacrylate
  - for absolute molecular weight: polymethyl methacrylate Using the intrinsic viscosity $[\eta]_{branch}$ of the PVA as the subject of the measurement and the intrinsic viscosity $[\eta]_{linear}$ of the linear PVA, on each absolute molecular weight measured, the degree of branching $g_m$ on each absolute molecular weight was determined according to the above equations (1) and (2). The smallest degree of branching $g_m$ in the range of the absolute molecular weight of 200,000 or more and 800,000 or less was defined as the minimum degree of branching. In addition, the ratio $g_A/g_B$ of the degree of branching of the vinyl alcohol polymer having an absolute molecular weight of 200,000 $g_A$ to the degree of branching of the vinyl alcohol polymer having an absolute molecular weight of 800,000 gr was determined.

Figure 2:
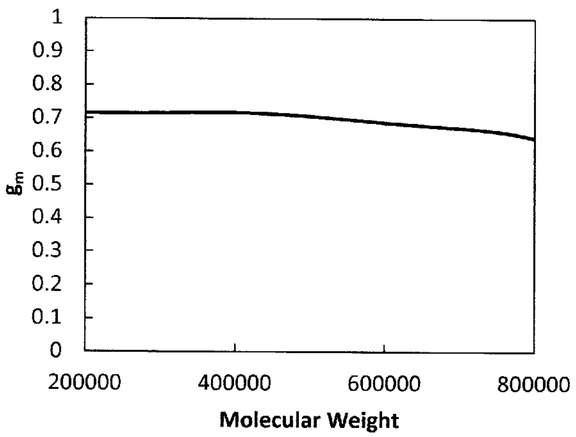
FIG. 2 is a graph showing a relationship between the absolute molecular weight and the degree of branching ($g_m$) of PVA-1 in EXAMPLES.

As one example of the measurement results, the result of PVA-1 described later is shown in FIGS. 1 and 2. FIG. 1 is a graph (Mark-Houwink plot) in which the absolute molecular weight and the intrinsic viscosity ($[\eta]_{branch}$ or $[\eta]_{linear}$) of: PVA-1 as the subject of the measurement; and PVA-17 being a corresponding linear PVA are plotted. FIG. 2 is a graph in which the degree of branching ($g_m$) on each absolute molecular weight of PVA-1 determined according the above equations (1) and (2), based on the results shown in FIG. 1 as described above is plotted.

Particle Size Distribution

Particle size distribution of the powder for use as a creping adhesive was measured by a dry sieve procedure disclosed in JIS Z8815:1994. Using each sieve having a mesh opening size of 1.00 mm. 500 μm, or 180 μm: a proportion of the mass (percentage content: % by mass) of the powder capable of passing through a sieve having a mesh opening size of 1.00 mm: a proportion of the mass (percentage content: % by mass) of the powder capable of passing through a sieve having a mesh opening size of 500 μm; and a proportion of the mass (percentage content: % by mass) of the powder capable of passing through a sieve having a mesh opening size of 180 μm, with respect to the mass of the powder for use as a creping adhesive before being sieved were determined, respectively. It is to be noted that the mesh opening size conforms to nominal mesh opening size W in accordance with JIS Z8801, 2006.

Insoluble Content

In a water bath preset to 60° C., a 500 mL flask with a stirrer was provided, and 288 g of distilled water was charged into this flask and stirring was started at 150 rpm. 12 g of the powder for use as a creping adhesive was weighed and this powder for use as a creping adhesive was gradually charged into the flask. The powder for use as a creping adhesive was charged in the total amount (12 g), and the stirring was continued for 60 min to give an aqueous solution. Thereafter, using the aqueous solution thus obtained, particles (undissolved particles) remaining without being dissolved were filtered with a metal filter having a mesh opening size of 63 μm. Then, the filter was sufficiently washed with warm water at 30° C., and the solution attached to the filter was removed to leave only the undissolved particles on the filter. Thereafter, the filter was dried by a heating dryer at 120° C. for 1 hour. The mass of the filter after drying was compared with the mass of the filter before being used in filtration, whereby the mass of the undissolved particles was calculated. The mass of the undissolved particles with respect to the powder for use as a creping adhesive (12 g) used was employed for the proportion (ppm) of the insoluble matter contained.

Fluidity of Creping Adhesive

Figure 3:
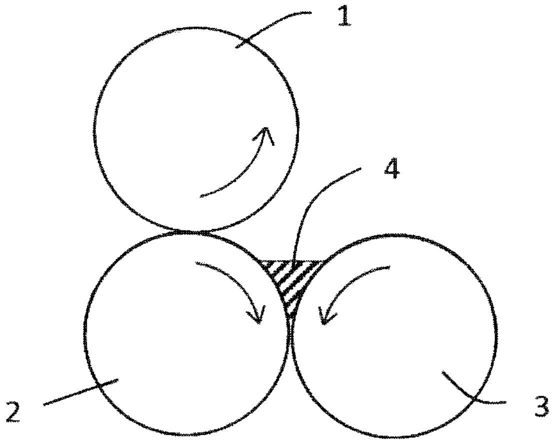
FIG. 3 is a drawing which describes a method for evaluating fluidity in EXAMPLES.

With regard to the creping adhesive obtained in Examples and Comparative Examples, the following evaluation was performed by using three rolls, 1 to 3, shown in FIG. 3. A surface temperature of the rolls 1 to 3 was adjusted to 30° C. The creping adhesive was added between the roll 2 and the roll 3, and an evaluation in accordance with the following criteria was performed by visual inspection to determine whether drops of the creping adhesive spattered from between the roll 1 and the roll 2 upon performing rotation such that a surface speed of the roll 1 was 300 m/min.

A: no drops spattered at all

B: a small number of drops spattered

C: a large number of drops spattered

Thread-Forming Property of Creping Adhesive

The creping adhesives obtained in Examples and Comparative Examples were applied on a stainless steel plate in an environment at 20° C., and 65% RH such that the thickness in a wet state became 300 μm. Immediately after the applying, a parallel plate having a diameter of 2 cm and a weight of 56 g was pressed thereon from above, and slowly pulled up after 1 sec. A height of the creping adhesive stretched was evaluated according to the following criteria.

A: 8 mm or more

B: from 5 mm to less than 8 mm

C: less than 5 mm

Wet Adhesiveness of Creping Adhesive

The creping adhesives obtained in Examples and Comparative Examples were each blended with Crepetrol (registered trademark) 9750 manufactured by SOLENIS, being a polyamidepolyamine-epihalohydrin resin to give a solid content ratio of 3:1, whereby each sample for measurement was obtained. 10.5 g of each sample for measurement thus produced was poured on a disposable tray made of polypropylene, and dried with a dryer set at 80° C. for 1 hour, whereby a thin film having a thickness of 70 μm was formed. The thin film thus produced was cut out into a 4 cm×4 cm square, and affixed to an aluminum cup using a double-stick tape. A kitchen paper piece was affixed to a parallel plate having a diameter of 2 cm and a weight of 26 g, and the kitchen paper was evenly moisturized with 0.05 g of distilled water. A weight of 20 g was attached to the aluminum cup, and the moisturized kitchen paper portion was pressed thereon with own weight. After 20 sec, the parallel plate was pulled up and a time period that had lapsed until the aluminum cup fell from the kitchen paper was evaluated according to the following criteria.

A: 40 sec or more

B: 20 sec or more and less than 40 sec

C: 5 sec or more and less than 20 sec

D: less than 5 sec

Production of Powder-1

Into a reactor equipped with a stirrer, a reflux condenser, a nitrogen inlet tube, a comonomer dripping port and a polymerization initiator addition port. 920 parts by mass of vinyl acetate and 80 parts by mass of methanol were charged, and nitrogen substitution in the system was carried out for 30 min while bubbling nitrogen. Further, monomethyl maleate was used as the monomer (a), and nitrogen substitution in a methanol solution of monomethyl maleate (concentration: 10%) was carried out by bubbling nitrogen gas. Elevation of the temperature in the reactor was started, and when the internal temperature became 60° C. 0.25 parts by mass of 2,2'-azobisisobutyronitrile (AIBN) were added thereto to start the polymerization. To the reactor was added the methanol solution of monomethyl maleate dropwise, and the polymerization was allowed at 60° C. for 2 hrs while the monomer composition ratio in the polymerization solution was maintained to be constant. Thereafter, the mixture was cooled to stop the polymerization. The total amount of the monomer (a) added until the polymerization was stopped was 0.6 parts by mass, and the solid content concentration when the polymerization was stopped was 22.9%, with the conversion (rate of polymerization) being 25%. Subsequently, unreacted monomers were removed while adding methanol at intervals at 30° C. under a reduced pressure to obtain a methanol solution of the vinyl ester polymer (concentration: 25.3%). Next, to 736.7 parts by mass of the methanol solution of the vinyl ester polymer (the polymer in the solution: 150.0 parts by mass) prepared by further adding methanol to this methanol solution. 6.98 parts by mass of a 10% methanol solution of sodium hydroxide and water were added such that the moisture content in the system became 1%, and saponification was allowed at 40° C. (the polymer concentration of the saponification solution: 20%: the molar ratio of sodium hydroxide to the vinyl acetate unit in the polymer: 0.01; and the moisture content: 1%). Since a gelatinous material was produced in about 10 min after the addition of the methanol solution of sodium hydroxide, this gelatinous matter was ground with a grinder and further left to stand at 40° C. for 1 hour to allow the saponification to proceed, and thereafter 600 parts by mass of methyl acetate were added to neutralize remaining alkali. After completion of neutralization was ascertained by using a phenolphthalein indicator, the mixture was filtered off to obtain a white solid. To this white solid were added 600 parts by mass of methanol, and the mixture was left to stand at 40° C. for 30 min to permit washing. After the washing operation was performed twice, a white solid obtained by deliquoring through centrifugation was subjected to preliminary drying overnight. Thereafter, while the fine powder was eliminated, a heat treatment was carried out at 120° C. for 4.5 hrs with a dryer to give PVA-1 powder.

Powder-I was obtained by: adding to the PVA-I powder having a temperature adjusted to a normal temperature, a nonionic surfactant (FOAMASTER (registered trademark)

WO2323, manufactured by BASF), being a defoaming agent, such that 1,000 ppm with respect to the mass of the PVA-I was provided; and entirely uniformly covering the powder with the nonionic surfactant. Physical properties of the PVA-1 and the powder-1 measured by the methods described above are shown in Tables 2 and 3.

Production of Powder-2 to Powder-7, Powder-10, Powder-12 to Powder-14

Each PVA (PVA-2 to PVA-7, PVA-10, PVA-12 to PVA-14) and each powder (powder-2 to powder-7, powder-10, powder-12 to powder-14) were obtained by a method similar to that in Production of Powder-1 except that: polymerization conditions such as the amount of vinyl acetate and methanol used, and the type and the amount of the monomer (a) used: saponification conditions such as the concentration of the vinyl ester polymer and the molar ratio of sodium hydroxide to the vinyl acetate unit in the saponification; and the heat treatment conditions were each changed as shown in Table 1. Physical properties of these PVAs and powders measured by the methods described above are shown in Tables 2 and 3.

Production of Powder-8

PVA-8 and powder-8 were obtained by a method similar to that in Production of Powder-1 except that fine powder was not eliminated during the heat treatment. Physical properties of the PVA and the powder measured by the methods described above are shown in Tables 2 and 3.

Production of Powder-9)

PVA-9) and powder-9 were obtained by a method similar to that in Production of Powder-1 except that the nonionic surfactant was not added. Physical properties of the PVA and the powder measured by the methods described above are shown in Tables 2 and 3.

Production of Powder-11

Into a reactor equipped with a stirrer, a reflux condenser, a nitrogen inlet tube, a comonomer dripping port, and a polymerization initiator addition port. 920 parts by mass of vinyl acetate and 80 parts by mass of methanol were charged, and nitrogen substitution in the system was carried out for 30 min while bubbling nitrogen. Elevation of the temperature in the reactor was started, and when the internal temperature became 60° C. 0.25 parts by mass of 2,2-azobisisobutyronitrile (AIBN) were added thereto to start the polymerization. The polymerization was allowed at 60° C. for 3 hrs, and thereafter, the mixture was cooled to stop the polymerization. The solid content concentration when the polymerization was stopped was 9.0%, with the conversion being 25%. Subsequently, unreacted monomers were removed while adding methanol at intervals at 30° C. under a reduced pressure to obtain a methanol solution of the vinyl ester polymer (concentration: 25.3%). Next, to 724.07 parts by mass of the methanol solution of the vinyl ester polymer (the polymer in the solution: 150 parts by mass) prepared by further adding methanol to this methanol solution. 6.97 parts by mass of a 10% methanol solution of sodium hydroxide and water were added such that the moisture content in the system became 1%, and saponification was allowed at 40° C. (the polymer concentration of the saponification solution: 20%: the molar ratio of sodium hydroxide to the vinyl acetate unit in the polymer: 0.01; and the moisture content: 1%). Since a gelatinous material was produced in about 10 min after the addition of the methanol solution of sodium hydroxide, this gelatinous matter was ground with a grinder and further left to stand at 40° C. for 1 hour to allow the saponification to proceed, and thereafter 750 parts by mass of methyl acetate were added to neutralize remaining alkali. After completion of neutralization was ascertained by using a phenolphthalein indicator, the mixture was filtered off to obtain a white solid. To this white solid were added 750) parts by mass of methanol, and the mixture was left to stand at 40° C. for 3 hrs to permit washing. After the washing operation was performed three times, a white solid obtained by deliquoring through centrifugation was subjected to vacuum drying at 40° C. overnight. Thereafter, while the fine powder was eliminated, a heat treatment was carried out at 120° C. for 4.5 hrs with a dryer to give PVA-11 powder.

Powder-11 was obtained by: adding to the PVA-11 powder having a temperature adjusted to a normal temperature, a nonionic surfactant (FOAMASTER (registered trademark) WO2323, manufactured by BASF), being a defoaming agent, such that 1,000 ppm with respect to the mass of the PVA-11 was provided; and entirely uniformly covering the powder with the nonionic surfactant. Physical properties of the PVA-11 and the powder-11 measured by the methods described above are shown in Tables 2 and 3.

Production of Powder-15 to Powder-21

Each unmodified PVA (PVA-15 to PVA-21) and each powder (powder-15 to powder-21) were obtained by a method similar to that in Production of Powder-11, except that: polymerization conditions such as usage amounts of vinyl acetate and methanol; saponification conditions such as a concentration of the vinyl ester polymer in the saponification and a molar ratio of sodium hydroxide to the vinyl acetate unit; and heating conditions were changed as shown in Table 1. In the column of the heat treatment conditions in Table 1. "-" denotes that the heat treatment was not performed. The physical properties of these PVAs and powders measured by the methods described above are shown in Tables 2 and 3. It is to be noted that some of the PVAs and the powders were synthesized for only the measurement of the degree of branching, and not subjected to a part of the measurements.

It is to be noted that regarding the measurement of the degree of branching, the PVA-15 corresponds to the PVA-13, the PVA-16 corresponds to the PVAs-2 and 6, the PVA-17 corresponds to the PVAs-1.5, and 7 to 9, the PVA-18 corresponds to the PVA-14, the PVA-19 corresponds to the PVA-3, the PVA-20 corresponds to the PVA-4, and the PVA-21 corresponds to the PV As-10 and 12.

EXAMPLE 1

A creping adhesive was produced by: adding 5 parts by mass of the powder-1 to 95 parts by mass of water: elevating the temperature to 90° C. with stirring; and cooling after 1 hour. Using the creping adhesive thus obtained, the fluidity was evaluated by the method described above. The results of the evaluations are shown in Table 4. In addition, a creping adhesive was produced by: adding 7 parts by mass of the powder-1 to 93 parts by mass of water: elevating the temperature to 90° C. with stirring; and cooling after 1 hour. Using the creping adhesive thus obtained, the thread-forming property and the wet adhesiveness were evaluated by the methods described above.

Examples 2 to 9, Comparative Examples 1 to 5

Creping adhesives were produced and evaluated in a similar manner to Example 1 except that the powder-I was changed to each powder shown in Table 4. The results of the evaluations are shown in Table 4.

EXAMPLE 10

The powder-15 and the powder-16 were blended at a ratio on mass basis of 40/60. A creping adhesive was produced and evaluated in a similar manner to Example 1 except that a thus obtained blend was used in place of the powder-1. Physical properties of the blend measured are shown in Table 3, and the results of the evaluations are shown in Table 4.

Comparative Example 6

The powder-15 and the powder-17 were blended at a ratio on mass basis of 20/80. A creping adhesive was produced and evaluated in a similar manner to Example 1 except that a thus obtained blend was used in place of the powder-1. Physical properties of the blend measured are shown in Table 3, and the results of the evaluations are shown in Table 4.

TABLE 1

| | | Usage amount | | | | | |
|---|---|---|---|---|---|---|---|
| | | | | monomer (a) | | | |
| | | vinyl acetate (parts by mass) | methanol (parts by mass) | Type | usage amount (parts by mass) | AIBN (parts by mass) | Conversion (%) |
| powder-1 | PVA-1 | 920 | 80 | monomethyl maleate | 0.6 | 0.25 | 25 |
| powder-2 | PVA-2 | 1400 | 30 | monomethyl maleate | 0.18 | 0.01 | 10 |
| powder-3 | PVA-3 | 920 | 80 | monomethyl maleate | 0.6 | 0.25 | 25 |
| powder-4 | PVA-4 | 920 | 80 | monomethyl maleate | 0.6 | 0.25 | 25 |
| powder-5 | PVA-5 | 920 | 80 | monomethyl maleate | 1.2 | 0.25 | 25 |
| powder-6 | PVA-6 | 920 | 80 | dimethyl maleate | 0.6 | 0.25 | 25 |
| powder-7 | PVA-7 | 920 | 80 | monomethyl fumarate | 0.6 | 0.25 | 25 |
| powder-8 | PVA-8 | 920 | 80 | monomethyl maleate | 0.6 | 0.25 | 25 |
| powder-9 | PVA-9 | 920 | 80 | monomethyl maleate | 0.6 | 0.25 | 25 |
| powder-10 | PVA-10 | 920 | 80 | monomethyl maleate | 0.6 | 0.25 | 25 |
| powder-11 | PVA-11 | 920 | 80 | — | 0 | 0.25 | 25 |
| powder-12 | PVA-12 | 920 | 80 | monomethyl maleate | 1.2 | 0.25 | 25 |
| powder-13 | PVA-13 | 700 | 1050 | monomethyl maleate | 12.1 | 0.84 | 60 |
| powder-14 | PVA-14 | 1180 | 400 | monomethyl maleate | 0.44 | 0.023 | 39 |
| powder-15 | PVA-15 | 700 | 800 | — | 0 | 0.1 | 30 |
| powder-16 | PVA-16 | 1600 | 30 | — | 0 | 0.01 | 8 |
| powder-17 | PVA-17 | 1400 | 50 | — | 0 | 0.01 | 10 |
| powder-18 | PVA-18 | 2300 | 300 | — | 0 | 0.1 | 25 |
| powder-19 | PVA-19 | 1400 | 100 | — | 0 | 0.05 | 8 |
| powder-20 | PVA-20 | 920 | 80 | — | 0 | 0.05 | 20 |
| powder-21 | PVA-21 | 930 | 70 | — | 0 | 0.05 | 20 |

| | Saponification conditions | | | | | |
|---|---|---|---|---|---|---|
| | vinyl ester | | | Heat treatment conditions | | |
| | polymer concentration (%) | NaOH molar ratio | moisture content (%) | temperature (° C.) | time period (hr) | Defoaming agent |
| powder-1 | 20 | 0.01 | 1 | 120 | 4.5 | added |
| powder-2 | 10 | 0.01 | 1 | 120 | 4.5 | added |
| powder-3 | 20 | 0.006 | 1 | 120 | 4.5 | added |
| powder-4 | 20 | 0.02 | 1 | 120 | 4.5 | added |
| powder-5 | 20 | 0.01 | 1 | 120 | 3 | added |
| powder-6 | 20 | 0.01 | 1 | 120 | 4.5 | added |
| powder-7 | 20 | 0.01 | 1 | 120 | 4.5 | added |
| powder-8 | 20 | 0.01 | 1 | 120 | 4.5 | added |
| powder-9 | 20 | 0.01 | 1 | 120 | 4.5 | not added |
| powder-10 | 20 | 0.01 | 1 | 120 | 0.4 | added |
| powder-11 | 20 | 0.01 | 1 | 120 | 4.5 | added |
| powder-12 | 20 | 0.01 | 1 | 105 | 6 | added |
| powder-13 | 25 | 0.009 | 1 | 120 | 6 | added |
| powder-14 | 25 | 0.008 | 1 | 110 | 5 | added |
| powder-15 | 25 | 0.009 | 1 | — | — | added |
| powder-16 | 10 | 0.01 | 1 | — | — | added |
| powder-17 | 20 | 0.01 | 1 | — | — | added |
| powder-18 | 25 | 0.008 | 1 | — | — | added |
| powder-19 | 20 | 0.006 | 1 | — | — | added |
| powder-20 | 20 | 0.02 | 1 | — | — | added |
| powder-21 | 20 | 0.01 | 1 | — | — | added |

TABLE 2

| | Viscosity-average degree of polymerization: P | Percentage content: S (mol %) | Degree of saponification (mol %) | S × P |
|---|---|---|---|---|
| PVA-1 | 3,500 | 0.2 | 88 | 700 |
| PVA-2 | 5,000 | 0.1 | 88 | 500 |
| PVA-3 | 3,500 | 0.2 | 80 | 700 |
| PVA-4 | 3,500 | 0.2 | 95 | 700 |
| PVA-5 | 3,500 | 0.4 | 88 | 1,400 |
| PVA-6 | 3,500 | 0.2 | 88 | 700 |
| PVA-7 | 3,500 | 0.2 | 88 | 700 |
| PVA-8 | 3,500 | 0.2 | 88 | 700 |
| PVA-9 | 3,500 | 0.2 | 88 | 700 |
| PVA-10 | 3,500 | 0.2 | 88 | 700 |
| PVA-11 | 3,500 | 0 | 88 | 0 |
| PVA-12 | 3,500 | 0.4 | 88 | 1,400 |
| PVA-13 | 420 | 1.9 | 88 | 798 |
| PVA-14 | 1,700 | 0.3 | 88 | 425 |
| PVA-15 | 800 | 0 | 88 | 0 |
| PVA-16 | 5,100 | 0 | 88 | 0 |
| PVA-17 | 4,500 | 0 | 88 | 0 |
| PVA-18 | 2,400 | 0 | 88 | 0 |
| PVA-19 | 5,000 | 0 | 80 | 0 |
| PVA-20 | 4,000 | 0 | 95 | 0 |
| PVA-21 | 3,800 | 0 | 88 | 0 |

TABLE 3

| | | PVA | | | Powder | | | |
|---|---|---|---|---|---|---|---|---|
| | | | | | | particle size distribution | | |
| | | Mw/Mn | minimum degree of branching | $g_A/g_B$ | insoluble content (ppm) | passed through sieve having mesh opening size of 180 µm (mass %) | passed through sieve having mesh opening size of 1.00 mm (mass %) | passed through sieve having mesh opening size of 500 µm (mass %) |
| Example 1 | powder-1 | 9.4 | 0.65 | 1.12 | 1,250 | 11.6 | 99.2 | 40.3 |
| Example 2 | powder-2 | 8.1 | 0.88 | 1.09 | 650 | 6.5 | 99.6 | 44.0 |
| Example 3 | powder-3 | 10.8 | 0.40 | 1.60 | 1,600 | 6.5 | 99.8 | 52.0 |
| Example 4 | powder-4 | 5.6 | 0.90 | 1.11 | 1,700 | 8.8 | 99.1 | 47.0 |
| Example 5 | powder-5 | 11.5 | 0.70 | 1.77 | 1,350 | 5.7 | 99.1 | 49.5 |
| Example 6 | powder-6 | 12.2 | 0.33 | 2.14 | 1,780 | 4.9 | 99.3 | 43.2 |
| Example 7 | powder-7 | 8.8 | 0.62 | 1.15 | 1,300 | 2.1 | 99.5 | 46.0 |
| Example 8 | powder-8 | 10.5 | 0.60 | 3.12 | 4,700 | 24.3 | 99.2 | 44.0 |
| Example 9 | powder-9 | 9.4 | 0.65 | 1.12 | 1,980 | 10.8 | 99.3 | 43.5 |
| Example 10 | powder-15/powder-16 = 40/60 | 4.2 | — | — | 340 | 6.5 | 99.4 | 46.5 |
| Comparative Example 1 | powder-10 | 3.6 | 0.98 | 1.01 | 250 | 8.3 | 99.5 | 48.5 |
| Comparative Example 2 | powder-11 | 3.5 | — | — | 610 | 6.7 | 99.4 | 38.5 |
| Comparative Example 3 | powder-12 | 3.7 | 0.95 | 1.01 | 170 | 7.2 | 99.7 | 52.0 |
| Comparative Example 4 | powder-13 | 3.4 | 0.22 | 2.59 | 770 | 3.4 | 99.6 | 45.0 |
| Comparative Example 5 | powder-14 | 2.3 | 0.82 | 1.08 | 360 | 8.1 | 99.8 | 50.0 |
| Comparative Example 6 | powder-15/powder-17 = 20/80 | 3.2 | — | — | 380 | 6.8 | 99.5 | 47.3 |

TABLE 4

| | | Fluidity | Thread-forming property | Wet adhesive-ness |
|---|---|---|---|---|
| Example 1 | powder-1 | B | A | A |
| Example 2 | powder-2 | B | A | A |
| Example 3 | powder-3 | A | A | B |
| Example 4 | powder-4 | B | B | B |
| Example 5 | powder-5 | A | A | A |
| Example 6 | powder-6 | B | A | A |
| Example 7 | powder-7 | B | A | A |
| Example 8 | powder-8 | C | A | B |
| Example 9 | powder-9 | B | A | B |

TABLE 4-continued

| | | Fluidity | Thread-forming property | Wet adhesive-ness |
|---|---|---|---|---|
| Example 10 | powder-15/powder-16 = 40/60 | B | B | B |
| Comparative Example 1 | powder-10 | C | C | C |
| Comparative Example 2 | powder-11 | C | C | C |
| Comparative Example 3 | powder-12 | C | C | C |
| Comparative Example 4 | powder-13 | A | C | D |
| Comparative Example 5 | powder-14 | A | C | D |
| Comparative Example 6 | powder-15/powder-17 = 20/80 | C | C | B |

As shown in Tables 3 and 4, each of creping adhesives of Examples 1 to 10 in which the powder containing PVA satisfying at least one of (i) and (ii) above was used was favorable in the thread-forming property (A or B), and also exhibited favorable wet adhesiveness (A or B). Each of the creping adhesives of Examples 1 to 7, 9, and 10, prepared with the powder which: has a low percentage content of the powder capable of passing through a sieve having a mesh opening size of 180 µm; and contains a small amount of the insoluble matter, was also favorable (A or B) in the fluidity. Furthermore, comparison of Example 1 and Example 9, which differed in terms of only the presence/absence of the defoaming agent contained in the powder, reveals that due to the defoaming agent being contained in the powder as in Example 1, the insoluble matter was decreased, whereby the wet adhesiveness was enhanced.

EXPLANATION OF THE REFERENCE SYMBOLS

1, 2, 3 roll

4 coating liquid

The invention claimed is:

1. A creping adhesive comprising a vinyl alcohol polymer (A), wherein at least one of (i) and (ii) below is satisfied:

(i) the vinyl alcohol polymer (A) comprises a vinyl alcohol polymer having a minimum degree of branching of 0.25 or more and 0.93 or less within a range of an absolute molecular weight being 200,000 or more and 800,000 or less, and a ratio Mw/Mn of a weight-average molecular weight Mw to a number-average molecular weight Mn of the vinyl alcohol polymer (A) is 2.5 or more; and (ii) the ratio Mw/Mn of the weight-average molecular weight Mw to the number-average molecular weight Mn of the vinyl alcohol polymer (A) is 3.8 or more, wherein the vinyl alcohol polymer (A) comprises a vinyl alcohol polymer (A1) having a structural unit derived from at least one selected from the group consisting of: a monomer comprising a carboxy group; and a derivative of the monomer, and wherein and the vinyl alcohol polymer (A1) satisfies the following inequation (II):

$$1.0 < g_A/g_B < 3.0 \quad \text{(II)}$$

in which:

$g_A$ represents a degree of branching of the vinyl alcohol polymer (A1) having an absolute molecular weight of 200,000; and $g_B$ represents a degree of branching of the vinyl alcohol polymer (A1) having an absolute molecular weight of 800,000.

2. The creping adhesive according to claim 1, wherein the at least one selected from the group consisting of: the monomer comprising a carboxy group; and the derivative of the monomer is at least one selected from the group consisting of: an ethylenic unsaturated dicarboxylic acid; and a monoester, a diester, and an anhydride thereof.

3. The creping adhesive according to claim 1, wherein the at least one selected from the group consisting of: the monomer comprising a carboxy group; and the derivative of the monomer is at least one selected from the group consisting of maleic acid, a maleic acid monoalkyl ester, a maleic acid dialkyl ester, maleic anhydride, fumaric acid, a fumaric acid monoalkyl ester, and a fumaric acid dialkyl ester.

4. The creping adhesive according to claim 1, wherein the vinyl alcohol polymer (A1) satisfies the following inequation (I):

$$S \times P > 250 \quad \text{(I)}$$

wherein, in the inequation (I),

S represents a percentage content (mol %), with respect to total structural units, of the structural unit derived from the at least one selected from the group consisting of: the monomer comprising a carboxy group; and the derivative of the monomer, and P represents a viscosity-average degree of polymerization.

5. The creping adhesive according to claim 1, wherein a degree of saponification of the vinyl alcohol polymer (A1) is 65 mol % or more and 99 mol % or less.

6. The creping adhesive according to any one of claim 1, wherein at least (i) above is satisfied, and the vinyl alcohol polymer having a minimum degree of branching of 0.25 or more and 0.93 or less within the range of an absolute molecular weight being 200,000 or more and 800,000 or less is the vinyl alcohol polymer (A1).

7. The creping adhesive according to claim 1, wherein the vinyl alcohol polymer (A) is a mixture of two or more types of vinyl alcohol polymers that are different from one another in terms of at least one of the number-average molecular weight and a viscosity-average degree of polymerization.

8. The creping adhesive according to claim 7, wherein a degree of saponification of at least one type of vinyl alcohol polymer of the two or more types of vinyl alcohol polymers is 65 mol % or more and 99 mol % or less.

9. The creping adhesive according to claim 1, which is an aqueous solution wherein the vinyl alcohol polymer (A) is dissolved in water.

10. The creping adhesive according to claim 1, further comprising a polyamide resin (B).

11. The creping adhesive according to claim 10, wherein the polyamide resin (B) is a polyamidepolyamine-epihalohydrin resin.

12. A powder for use as a creping adhesive comprising a vinyl alcohol polymer (A), wherein at least one of (i) and (ii) below is satisfied:

(i) the vinyl alcohol polymer (A) comprises a vinyl alcohol polymer having a minimum degree of branching of 0.25 or more and 0.93 or less within a range of an absolute molecular weight being 200,000 or more and 800,000 or less, and a ratio Mw/Mn of a weight-average molecular weight Mw to a number-average molecular weight Mn of the vinyl alcohol polymer (A) is 2.5 or more; and (ii) the ratio Mw/Mn of the weight-average molecular weight Mw to the number-average molecular weight Mn of the vinyl alcohol polymer (A) is 3.8 or more, and wherein a percentage content of the powder capable of passing through a sieve having a mesh opening size of 180 μm is 12% by mass or less.

13. The powder for use as a creping adhesive according to claim 12, wherein a percentage content of the powder capable of passing through a sieve having a mesh opening size of 1.00 mm is 97% by mass or more, and a percentage content of the powder capable of passing through a sieve having a mesh opening size of 500 μm is 40% by mass or more.

14. The powder for use as a creping adhesive according to claim 12, wherein an insoluble content of a mixture prepared by adding 4 parts by mass of the powder for use as a creping adhesive to 96 parts by mass of water followed by stirring at 150 rpm and 60° C. for 1 hour is 0.1 ppm or more and less than 2,000 ppm.

15. The powder for use as a creping adhesive according to claim 12, wherein the powder further comprises a defoaming agent (C).

16. The powder for use as a creping adhesive according to claim 15, wherein the defoaming agent (C) is at least one selected from the group consisting of a nonionic surfactant and an anionic surfactant.

17. A method for producing a creping adhesive, the method comprising dissolving a vinyl alcohol polymer (A) in water, wherein at least one of (i) and (ii) below is satisfied:

(i) the vinyl alcohol polymer (A) comprises a vinyl alcohol polymer having a minimum degree of branching of 0.25 or more and 0.93 or less within a range of an absolute molecular weight being 200,000 or more and 800,000 or less, and a ratio Mw/Mn of a weight-average molecular weight Mw to a number-average molecular weight Mn of the vinyl alcohol polymer (A) is 2.5 or more; and (ii) the ratio Mw/Mn of the weight-average molecular weight Mw to the number-average molecular weight Mn of the vinyl alcohol polymer (A) is 3.8 or more, wherein the vinyl alcohol polymer (A) comprises a vinyl alcohol polymer (A1) having a structural unit derived from at least one selected from the group consisting of: a monomer comprising a carboxy group; and a derivative of the monomer, and wherein and the vinyl alcohol polymer (A1) satisfies the following inequation (II):

$$1.0 < g_A/g_B < 3.0 \quad \text{(II)}$$

in which:

$g_A$ represents a degree of branching of the vinyl alcohol polymer (A1) having an absolute molecular weight of 200,000; and $g_B$ represents a degree of branching of the vinyl alcohol polymer (A1) having an absolute molecular weight of 800,000.

18. The method for producing a creping adhesive according to claim 17, wherein at least (ii) above is satisfied, and as the vinyl alcohol polymer (A), a mixture of two or more types of vinyl alcohol polymers that are different from one another in terms of at least one of the number-average molecular weight and the viscosity-average degree of polymerization is used.

19. A toilet paper, a tissue paper, a paper towel, a kitchen paper, or a napkin base paper comprising the creping adhesive according to claim 1.

20. A paper product, wherein the paper product is a toilet paper, a tissue paper, a paper towel, a kitchen paper, or a napkin base paper, and the paper product comprises a vinyl alcohol polymer (A), wherein at least one of (i) and (ii) below is satisfied:

(i) the vinyl alcohol polymer (A) comprises a vinyl alcohol polymer having a minimum degree of branching of 0.25 or more and 0.93 or less within a range of an absolute molecular weight being 200,000 or more and 800,000 or less, and a ratio Mw/Mn of a weight-average molecular weight Mw to a number-average molecular weight Mn of the vinyl alcohol polymer (A) is 2.5 or more; and (ii) the ratio Mw/Mn of the weight-average molecular weight Mw to the number-average molecular weight Mn of the vinyl alcohol polymer (A) is 3.8 or more, wherein the vinyl alcohol polymer (A) comprises a vinyl alcohol polymer (A1) having a structural unit derived from at least one selected from the group consisting of: a monomer comprising a carboxy group; and a derivative of the monomer, and wherein and the vinyl alcohol polymer (A1) satisfies the following inequation (II):

$$1.0 < g_A/g_B < 3.0 \quad \text{(II)}$$

in which:

$g_A$ represents a degree of branching of the vinyl alcohol polymer (A1) having an absolute molecular weight of 200,000; and $g_B$ represents a degree of branching of the vinyl alcohol polymer (A1) having an absolute molecular weight of 800,000.

* * * * *